United States Patent
Kurokawa et al.

(10) Patent No.: US 10,714,139 B2
(45) Date of Patent: *Jul. 14, 2020

(54) MAGNETIC RECORDING MEDIUM HAVING CHARACTERIZED MAGNETIC LAYER

(71) Applicant: FUJIFILM Corporation, Tokyo (JP)

(72) Inventors: Takuto Kurokawa, Minami-ashigara (JP); Norihito Kasada, Minami-ashigara (JP); Toshio Tada, Minami-ashigara (JP); Eiki Ozawa, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/037,564

(22) Filed: Jul. 17, 2018

(65) Prior Publication Data

US 2019/0027176 A1 Jan. 24, 2019

(30) Foreign Application Priority Data

Jul. 19, 2017 (JP) .................. 2017-140015

(51) Int. Cl.
*G11B 5/70* (2006.01)
*G11B 5/706* (2006.01)
*G11B 5/708* (2006.01)

(52) U.S. Cl.
CPC ............ *G11B 5/70615* (2013.01); *G11B 5/70* (2013.01); *G11B 5/7085* (2013.01); *G11B 5/70678* (2013.01)

(58) Field of Classification Search
None
See application file for complete search history.

(56) References Cited

U.S. PATENT DOCUMENTS

| | | |
|---|---|---|
| 3,966,686 A | 6/1976 | Asakura et al. |
| 4,112,187 A | 9/1978 | Asakura et al. |
| 4,425,404 A | 1/1984 | Suzuki et al. |
| 4,693,930 A | 9/1987 | Kuo et al. |
| 4,746,569 A | 5/1988 | Takahashi et al. |
| 4,825,317 A | 4/1989 | Rausch |
| 5,242,752 A | 9/1993 | Isobe et al. |
| 5,419,938 A | 5/1995 | Kagotani et al. |
| 5,445,881 A | 8/1995 | Irie |
| 5,474,814 A | 12/1995 | Komatsu et al. |
| 5,496,607 A | 3/1996 | Inaba et al. |
| 5,540,957 A | 7/1996 | Ueda et al. |
| 5,585,032 A | 12/1996 | Nakata et al. |
| 5,645,917 A | 7/1997 | Ejiri et al. |
| 5,689,384 A | 11/1997 | Albrecht et al. |
| 5,728,454 A | 3/1998 | Inaba et al. |
| 5,786,074 A | 6/1998 | Soui |
| 5,827,600 A | 10/1998 | Ejiri et al. |
| 5,835,314 A | 11/1998 | Moodera et al. |
| 6,099,957 A | 8/2000 | Yamamoto et al. |
| 6,183,606 B1 | 2/2001 | Kuo et al. |
| 6,207,252 B1 | 3/2001 | Shimomura |
| 6,228,461 B1 | 5/2001 | Sueki et al. |
| 6,254,964 B1 | 7/2001 | Saito et al. |
| 6,261,647 B1 | 7/2001 | Komatsu et al. |
| 6,268,043 B1 | 7/2001 | Koizumi et al. |
| 6,496,328 B1 | 12/2002 | Dugas |
| 6,579,826 B2 | 6/2003 | Furuya et al. |
| 6,649,256 B1 | 11/2003 | Buczek et al. |
| 6,686,022 B2 | 2/2004 | Takano et al. |
| 6,770,359 B2 | 8/2004 | Masaki |
| 6,791,803 B2 | 9/2004 | Saito et al. |
| 6,835,451 B2 | 12/2004 | Eijiri |
| 6,835,461 B1 | 12/2004 | Yamagata et al. |
| 6,921,592 B2 | 7/2005 | Tani et al. |
| 6,939,606 B2 | 9/2005 | Hashimoto et al. |
| 6,950,269 B1 | 9/2005 | Johnson |
| 6,994,925 B2 | 2/2006 | Masaki |
| 7,014,927 B2 | 3/2006 | Sueki et al. |
| 7,029,726 B1 | 4/2006 | Chen et al. |
| 7,153,366 B1 | 12/2006 | Chen et al. |

(Continued)

FOREIGN PATENT DOCUMENTS

| | | |
|---|---|---|
| DE | 101 46 429 A1 | 3/2002 |
| EP | 0 520 155 B1 | 8/1996 |

(Continued)

OTHER PUBLICATIONS

U.S. Appl. No. 15/052,115, Patented as U.S. Pat. No. 9,704,527.
U.S. Appl. No. 15/218,190, Patented as U.S. Pat. No. 9,721,606.
U.S. Appl. No. 15/280,195, Allowed.
U.S. Appl. No. 15/422,821, Patented as U.S. Pat. No. 10,475,481.
U.S. Appl. No. 15/466,143, Patented as U.S. Pat. No. 10,347,279.
U.S. Appl. No. 15/466,143, Patented as U.S. Pat. No. 9,837,116.
U.S. Appl. No. 15/619,012, Patented as U.S. Pat. No. 10,515,660.
U.S. Appl. No. 15/624,897, Patented as U.S. Pat. No. 10,510,368.
U.S. Appl. No. 15/624,792, Patented as U.S. Pat. No. 10,497,388.
U.S. Appl. No. 15/626,832, Patented as U.S. Pat. No. 10,510,370.
U.S. Appl. No. 15/625,428, Patented as U.S. Pat. No. 10,403,318.
U.S. Appl. No. 14/978,834, Patented as U.S. Pat. No. 9,721,605.
U.S. Appl. No. 14/757,555, Patented as U.S Pat. No. 9,711,174.
U.S. Appl. No. 15/197,046, Patented as U.S. Pat. No. 9,721,607.
U.S. Appl. No. 15/380,336, Patented as U.S. Pat. No. 10,522,180.

(Continued)

*Primary Examiner* — Kevin M Bernatz
(74) *Attorney, Agent, or Firm* — Sughrue Mion, PLLC

(57) ABSTRACT

The magnetic recording medium includes a non-magnetic support and a magnetic layer containing ferromagnetic powder and a binder, in which the ferromagnetic powder is ferromagnetic hexagonal ferrite powder, the magnetic layer contains an abrasive, an intensity ratio of a peak intensity of a diffraction peak of (110) plane of a crystal structure of the hexagonal ferrite, determined by performing X-ray diffraction analysis on the magnetic layer by using an In-Plane method, to a peak intensity of a diffraction peak of (114) plane of the crystal structure is equal to or higher than 0.5 and equal to or lower than 4.0, a squareness ratio of the magnetic recording medium in a vertical direction is equal to or higher than 0.65 and equal to or lower than 1.00, and a contact angle with 1-bromonaphthalene measured within a surface of the magnetic layer is in a range of 50.0° to 55.0°.

5 Claims, No Drawings

(56) References Cited

U.S. PATENT DOCUMENTS

| | | |
|---|---|---|
| 7,255,908 B2 | 8/2007 | Ishikawa et al. |
| 7,511,907 B2 | 3/2009 | Dugas et al. |
| 7,515,383 B2 | 4/2009 | Saito et al. |
| 7,656,602 B2 | 2/2010 | Iben et al. |
| 7,803,471 B1 | 9/2010 | Ota et al. |
| 7,839,599 B2 | 11/2010 | Bui et al. |
| 8,000,057 B2 | 8/2011 | Bui et al. |
| 8,318,242 B2 | 11/2012 | Bradshaw et al. |
| 8,524,108 B2 | 9/2013 | Hattori |
| 8,535,817 B2 * | 9/2013 | Imaoka .............. G11B 5/70 428/844 |
| 8,576,510 B2 | 11/2013 | Cherubini et al. |
| 8,681,451 B2 | 3/2014 | Harasawa et al. |
| 9,105,294 B2 | 8/2015 | Jensen et al. |
| 9,159,341 B2 | 10/2015 | Bradshaw et al. |
| 9,311,946 B2 | 4/2016 | Tanaka et al. |
| 9,324,343 B2 | 4/2016 | Bradshaw et al. |
| 9,495,985 B2 | 10/2016 | Biskeborn et al. |
| 9,530,444 B2 | 12/2016 | Kasada |
| 9,542,967 B2 | 1/2017 | Sekiguchi et al. |
| 9,564,161 B1 | 2/2017 | Cherubini et al. |
| 9,601,146 B2 | 3/2017 | Kasada et al. |
| 9,704,425 B2 | 7/2017 | Zhang et al. |
| 9,704,525 B2 | 7/2017 | Kasada |
| 9,704,527 B2 | 7/2017 | Kasada |
| 9,711,174 B2 | 7/2017 | Kasada et al. |
| 9,721,605 B2 | 8/2017 | Oyanagi et al. |
| 9,721,606 B2 | 8/2017 | Kasada |
| 9,721,607 B2 | 8/2017 | Tada et al. |
| 9,748,026 B2 | 8/2017 | Shirata |
| 9,773,519 B2 | 9/2017 | Kasada et al. |
| 9,779,772 B1 | 10/2017 | Kasada et al. |
| 9,837,104 B1 | 12/2017 | Biskeborn |
| 9,837,116 B2 | 12/2017 | Ozawa et al. |
| 9,959,894 B2 | 5/2018 | Omura |
| 9,972,351 B1 | 5/2018 | Kaneko et al. |
| 9,978,414 B1 | 5/2018 | Kaneko et al. |
| 9,984,710 B2 | 5/2018 | Kasada |
| 9,984,712 B1 * | 5/2018 | Ozawa ................ G11B 5/3909 |
| 9,984,716 B1 | 5/2018 | Kaneko et al. |
| 10,008,230 B1 | 6/2018 | Ozawa et al. |
| 10,026,430 B2 | 7/2018 | Kasada et al. |
| 10,026,433 B2 | 7/2018 | Kasada et al. |
| 10,026,434 B2 | 7/2018 | Oyanagi et al. |
| 10,026,435 B2 | 7/2018 | Kasada et al. |
| 10,062,403 B1 | 8/2018 | Kasada et al. |
| 10,074,393 B2 | 9/2018 | Kaneko et al. |
| 10,134,433 B2 | 11/2018 | Kasada et al. |
| 10,170,144 B2 | 1/2019 | Ozawa et al. |
| 10,366,721 B2 * | 7/2019 | Kasada ............. G11B 5/00817 |
| 10,373,639 B2 * | 8/2019 | Kasada .................... G11B 5/71 |
| 10,403,314 B2 * | 9/2019 | Kasada ............. G11B 5/00813 |
| 10,403,316 B2 * | 9/2019 | Kasada ............. G11B 5/70678 |
| 10,403,317 B2 * | 9/2019 | Kasada ............. G11B 5/70678 |
| 10,410,665 B2 * | 9/2019 | Ozawa .................. G11B 5/70 |
| 10,410,666 B2 * | 9/2019 | Kasada .................... G11B 5/82 |
| 10,438,621 B2 * | 10/2019 | Kasada .................... G11B 5/72 |
| 2001/0038928 A1 | 11/2001 | Nakamigawa et al. |
| 2001/0053458 A1 | 12/2001 | Suzuki et al. |
| 2002/0072472 A1 | 7/2002 | Furuya et al. |
| 2002/0122339 A1 | 9/2002 | Takano et al. |
| 2003/0059649 A1 | 3/2003 | Saliba et al. |
| 2003/0091866 A1 | 5/2003 | Ejiri et al. |
| 2003/0124386 A1 | 7/2003 | Masaki |
| 2003/0128453 A1 | 7/2003 | Saito et al. |
| 2003/0170498 A1 | 9/2003 | Inoue |
| 2003/0228492 A1 | 12/2003 | Ejiri et al. |
| 2003/0228493 A1 | 12/2003 | Doushita et al. |
| 2004/0018388 A1 | 1/2004 | Kitamura et al. |
| 2004/0053074 A1 | 3/2004 | Jingu et al. |
| 2004/0072025 A1 | 4/2004 | Kishimoto et al. |
| 2004/0197605 A1 | 10/2004 | Seki et al. |
| 2004/0213948 A1 | 10/2004 | Saito et al. |
| 2004/0218304 A1 | 11/2004 | Goker et al. |
| 2004/0265643 A1 | 12/2004 | Ejiri |
| 2005/0057838 A1 | 3/2005 | Ohtsu |
| 2005/0153170 A1 | 7/2005 | Inoue et al. |
| 2005/0196645 A1 | 9/2005 | Doi et al. |
| 2005/0260456 A1 | 11/2005 | Hanai et al. |
| 2005/0260459 A1 | 11/2005 | Hanai et al. |
| 2005/0264935 A1 | 12/2005 | Sueki et al. |
| 2006/0008681 A1 | 1/2006 | Hashimoto et al. |
| 2006/0035114 A1 | 2/2006 | Kuse et al. |
| 2006/0056095 A1 | 3/2006 | Saitou |
| 2006/0068232 A1 | 3/2006 | Mikamo et al. |
| 2006/0187589 A1 | 8/2006 | Harasawa et al. |
| 2006/0232883 A1 | 10/2006 | Biskeborn et al. |
| 2007/0009769 A1 | 1/2007 | Kanazawa |
| 2007/0020489 A1 | 1/2007 | Yamazaki et al. |
| 2007/0020490 A1 | 1/2007 | Harasawa et al. |
| 2007/0224456 A1 | 9/2007 | Murao et al. |
| 2007/0230054 A1 | 10/2007 | Takeda et al. |
| 2007/0231606 A1 | 10/2007 | Hanai |
| 2008/0057351 A1 | 3/2008 | Meguro et al. |
| 2008/0144211 A1 | 6/2008 | Weber et al. |
| 2008/0152956 A1 | 6/2008 | Murayama et al. |
| 2008/0174897 A1 | 7/2008 | Bates et al. |
| 2008/0297950 A1 | 12/2008 | Noguchi et al. |
| 2008/0311308 A1 | 12/2008 | Lee et al. |
| 2009/0027812 A1 | 1/2009 | Noguchi et al. |
| 2009/0087689 A1 | 4/2009 | Doushita et al. |
| 2009/0161249 A1 | 6/2009 | Takayama et al. |
| 2009/0162701 A1 | 6/2009 | Jensen et al. |
| 2010/0000966 A1 | 1/2010 | Kamata et al. |
| 2010/0035086 A1 | 2/2010 | Inoue et al. |
| 2010/0035088 A1 | 2/2010 | Inoue |
| 2010/0053810 A1 | 3/2010 | Biskeborn et al. |
| 2010/0073816 A1 | 3/2010 | Komori et al. |
| 2010/0081011 A1 | 4/2010 | Nakamura |
| 2010/0134929 A1 | 6/2010 | Ito |
| 2010/0227201 A1 | 9/2010 | Sasaki et al. |
| 2010/0246073 A1 | 9/2010 | Katayama |
| 2011/0003241 A1 | 1/2011 | Kaneko et al. |
| 2011/0051280 A1 | 3/2011 | Karp et al. |
| 2011/0052908 A1 | 3/2011 | Imaoka |
| 2011/0077902 A1 | 3/2011 | Awezec et al. |
| 2011/0151281 A1 | 6/2011 | Inoue |
| 2011/0244272 A1 | 10/2011 | Suzuki et al. |
| 2012/0045664 A1 | 2/2012 | Tanaka et al. |
| 2012/0152891 A1 | 6/2012 | Brown et al. |
| 2012/0177951 A1 | 7/2012 | Yamazaki et al. |
| 2012/0183811 A1 | 7/2012 | Hattori et al. |
| 2012/0196156 A1 | 8/2012 | Suzuki |
| 2012/0243120 A1 * | 9/2012 | Harasawa ................ G11B 5/70 360/90 |
| 2012/0244387 A1 | 9/2012 | Mori et al. |
| 2012/0251845 A1 | 10/2012 | Wang et al. |
| 2013/0029183 A1 | 1/2013 | Omura et al. |
| 2013/0084470 A1 | 4/2013 | Hattori et al. |
| 2013/0088794 A1 | 4/2013 | Cherubini et al. |
| 2013/0256584 A1 | 10/2013 | Yamazaki et al. |
| 2013/0260179 A1 | 10/2013 | Kasada et al. |
| 2013/0279040 A1 | 10/2013 | Cideciyan et al. |
| 2013/0286510 A1 | 10/2013 | Rothermel et al. |
| 2014/0011055 A1 | 1/2014 | Suzuki et al. |
| 2014/0130067 A1 | 5/2014 | Madison et al. |
| 2014/0139944 A1 | 5/2014 | Johnson et al. |
| 2014/0272474 A1 | 9/2014 | Kasada |
| 2014/0295214 A1 | 10/2014 | Tada et al. |
| 2014/0342189 A1 | 11/2014 | Tachibana et al. |
| 2014/0366990 A1 | 12/2014 | Lai et al. |
| 2014/0374645 A1 | 12/2014 | Kikuchi et al. |
| 2015/0043101 A1 | 2/2015 | Biskeborn et al. |
| 2015/0098149 A1 | 4/2015 | Bates et al. |
| 2015/0111066 A1 | 4/2015 | Terakawa et al. |
| 2015/0123026 A1 | 5/2015 | Masada et al. |
| 2015/0302879 A1 | 10/2015 | Holmberg et al. |
| 2015/0380036 A1 | 12/2015 | Kasada et al. |
| 2016/0061447 A1 | 3/2016 | Kobayashi |
| 2016/0064025 A1 | 3/2016 | Kurokawa et al. |
| 2016/0092315 A1 | 3/2016 | Ashida et al. |
| 2016/0093321 A1 | 3/2016 | Aoshima et al. |
| 2016/0093322 A1 | 3/2016 | Kasada et al. |
| 2016/0093323 A1 | 3/2016 | Omura |

(56) References Cited

U.S. PATENT DOCUMENTS

| | | |
|---|---|---|
| 2016/0180875 A1 | 6/2016 | Tanaka et al. |
| 2016/0189739 A1 | 6/2016 | Kasada et al. |
| 2016/0189740 A1 | 6/2016 | Oyanagi et al. |
| 2016/0247530 A1 | 8/2016 | Kasada |
| 2016/0260449 A1 | 9/2016 | Ahmad et al. |
| 2016/0276076 A1 | 9/2016 | Kasada |
| 2017/0032812 A1 | 2/2017 | Kasada |
| 2017/0053669 A1 | 2/2017 | Kasada |
| 2017/0053670 A1 | 2/2017 | Oyanagi et al. |
| 2017/0053671 A1 | 2/2017 | Kasada et al. |
| 2017/0058227 A1 | 3/2017 | Kondo et al. |
| 2017/0092315 A1 | 3/2017 | Ozawa et al. |
| 2017/0130156 A1 | 5/2017 | Kondo et al. |
| 2017/0178675 A1 | 6/2017 | Kasada |
| 2017/0178676 A1 | 6/2017 | Kasada |
| 2017/0178677 A1 | 6/2017 | Kasada |
| 2017/0186456 A1 | 6/2017 | Tada et al. |
| 2017/0186460 A1 | 6/2017 | Kasada et al. |
| 2017/0221513 A1 | 8/2017 | Hiroi et al. |
| 2017/0221516 A1 | 8/2017 | Oyanagi et al. |
| 2017/0221517 A1 | 8/2017 | Ozawa et al. |
| 2017/0249963 A1* | 8/2017 | Oyanagi .................. G11B 5/71 |
| 2017/0249964 A1* | 8/2017 | Kasada .................. G11B 5/706 |
| 2017/0249965 A1* | 8/2017 | Kurokawa .............. G11B 5/70 |
| 2017/0249966 A1 | 8/2017 | Tachibana et al. |
| 2017/0287517 A1 | 10/2017 | Hosoya et al. |
| 2017/0355022 A1 | 12/2017 | Kaneko et al. |
| 2017/0358318 A1 | 12/2017 | Kasada et al. |
| 2017/0372726 A1 | 12/2017 | Kasada et al. |
| 2017/0372727 A1 | 12/2017 | Kasada et al. |
| 2017/0372736 A1 | 12/2017 | Kaneko et al. |
| 2017/0372737 A1 | 12/2017 | Oyanagi et al. |
| 2017/0372738 A1 | 12/2017 | Kasada |
| 2017/0372739 A1 | 12/2017 | Ozawa et al. |
| 2017/0372740 A1 | 12/2017 | Ozawa et al. |
| 2017/0372741 A1 | 12/2017 | Kurokawa et al. |
| 2017/0372742 A1 | 12/2017 | Kaneko et al. |
| 2017/0372743 A1 | 12/2017 | Kasada et al. |
| 2017/0372744 A1 | 12/2017 | Ozawa et al. |
| 2018/0061446 A1 | 3/2018 | Kasada |
| 2018/0061447 A1 | 3/2018 | Kasada |
| 2018/0082710 A1* | 3/2018 | Tada .................. G11B 5/7305 |
| 2018/0137887 A1 | 5/2018 | Sekiguchi et al. |
| 2018/0182417 A1 | 6/2018 | Kaneko et al. |
| 2018/0182422 A1 | 6/2018 | Kawakami et al. |
| 2018/0182425 A1 | 6/2018 | Kasada et al. |
| 2018/0182426 A1* | 6/2018 | Ozawa .................. G11B 5/70 |
| 2018/0182427 A1 | 6/2018 | Kasada et al. |
| 2018/0182428 A1 | 6/2018 | Kasada et al. |
| 2018/0182429 A1 | 6/2018 | Kasada et al. |
| 2018/0182430 A1 | 6/2018 | Ozawa et al. |
| 2018/0240475 A1 | 8/2018 | Kasada |
| 2018/0240476 A1 | 8/2018 | Kasada et al. |
| 2018/0240478 A1* | 8/2018 | Kasada .................. G11B 5/78 |
| 2018/0240479 A1 | 8/2018 | Kasada et al. |
| 2018/0240481 A1 | 8/2018 | Kasada et al. |
| 2018/0240488 A1 | 8/2018 | Kasada |
| 2018/0240489 A1 | 8/2018 | Kasada et al. |
| 2018/0240490 A1* | 8/2018 | Kurokawa .............. G11B 5/70 |
| 2018/0240491 A1 | 8/2018 | Ozawa et al. |
| 2018/0240492 A1 | 8/2018 | Kasada |
| 2018/0240493 A1 | 8/2018 | Tada et al. |
| 2018/0240494 A1* | 8/2018 | Kurokawa .............. G11B 5/712 |
| 2018/0240495 A1 | 8/2018 | Kasada |
| 2018/0286439 A1 | 10/2018 | Ozawa et al. |
| 2018/0286442 A1 | 10/2018 | Ozawa et al. |
| 2018/0286443 A1 | 10/2018 | Ozawa et al. |
| 2018/0286444 A1 | 10/2018 | Kasada et al. |
| 2018/0286446 A1* | 10/2018 | Ozawa .................. G11B 5/712 |
| 2018/0286447 A1* | 10/2018 | Ozawa .................. G11B 5/712 |
| 2018/0286448 A1 | 10/2018 | Ozawa et al. |
| 2018/0286449 A1 | 10/2018 | Kasada et al. |
| 2018/0286450 A1 | 10/2018 | Kasada et al. |
| 2018/0286451 A1 | 10/2018 | Ozawa et al. |
| 2018/0286452 A1 | 10/2018 | Ozawa et al. |
| 2018/0286453 A1 | 10/2018 | Kasada et al. |
| 2018/0301165 A1 | 10/2018 | Oyanagi et al. |
| 2018/0350398 A1 | 12/2018 | Kawakami et al. |
| 2018/0350400 A1 | 12/2018 | Kaneko et al. |
| 2018/0358042 A1 | 12/2018 | Kasada et al. |
| 2018/0374507 A1 | 12/2018 | Kasada |
| 2019/0027167 A1* | 1/2019 | Tada .................. G11B 5/00813 |
| 2019/0027168 A1* | 1/2019 | Kasada .............. G11B 5/00813 |
| 2019/0027171 A1* | 1/2019 | Kasada .................. G11B 5/647 |
| 2019/0027172 A1* | 1/2019 | Kasada .................. G11B 5/647 |
| 2019/0027174 A1* | 1/2019 | Tada .................. G11B 5/66 |
| 2019/0027175 A1* | 1/2019 | Kurokawa .............. G11B 5/702 |
| 2019/0027177 A1 | 1/2019 | Kasada |
| 2019/0027178 A1* | 1/2019 | Kasada .................. G11B 5/735 |
| 2019/0027179 A1* | 1/2019 | Ozawa .................. G11B 5/735 |
| 2019/0027180 A1* | 1/2019 | Kasada .................. G11B 5/735 |
| 2019/0027181 A1* | 1/2019 | Ozawa .................. G11B 5/70 |
| 2019/0035424 A1 | 1/2019 | Endo |
| 2019/0051325 A1 | 2/2019 | Kasada et al. |
| 2019/0088278 A1* | 3/2019 | Kasada .................. G11B 5/714 |
| 2019/0096437 A1 | 3/2019 | Ozawa et al. |
| 2019/0103130 A1 | 4/2019 | Kasada et al. |
| 2019/0103131 A1* | 4/2019 | Kasada .............. G11B 5/00813 |
| 2019/0103133 A1* | 4/2019 | Ozawa .................. G11B 5/712 |
| 2019/0103134 A1* | 4/2019 | Kasada .................. G11B 5/72 |
| 2019/0103135 A1* | 4/2019 | Ozawa .................. G11B 5/78 |
| 2019/0130936 A1 | 5/2019 | Kaneko et al. |
| 2019/0259416 A1 | 8/2019 | Kawakami et al. |
| 2019/0295590 A1 | 9/2019 | Kaneko et al. |
| 2019/0304496 A1* | 10/2019 | Fujimoto .................. G11B 5/71 |
| 2020/0005814 A1 | 1/2020 | Kasada et al. |
| 2020/0005822 A1* | 1/2020 | Kasada .............. G11B 5/70678 |
| 2020/0005827 A1 | 1/2020 | Ozawa et al. |
| 2020/0035262 A1 | 1/2020 | Kasada |

FOREIGN PATENT DOCUMENTS

| | | |
|---|---|---|
| GB | 2495356 A | 4/2013 |
| JP | 61-11924 A | 1/1986 |
| JP | 61-139923 A | 6/1986 |
| JP | 61-139932 A | 6/1986 |
| JP | 63-129519 A | 6/1988 |
| JP | 63-249932 A | 10/1988 |
| JP | 63-298813 A | 12/1988 |
| JP | 64-057422 A | 3/1989 |
| JP | 64-060819 A | 3/1989 |
| JP | 1-276424 A | 11/1989 |
| JP | 2-227821 A | 9/1990 |
| JP | 5-258283 A | 10/1993 |
| JP | 5-298653 A | 11/1993 |
| JP | 7-57242 A | 3/1995 |
| JP | 9-73626 A | 3/1997 |
| JP | 11-110743 A | 4/1999 |
| JP | 11-175949 A | 7/1999 |
| JP | 11-259849 A | 9/1999 |
| JP | 11-273051 A | 10/1999 |
| JP | 2000-251240 A | 9/2000 |
| JP | 2002-157726 A | 5/2002 |
| JP | 2002-298332 A | 10/2002 |
| JP | 2002-329605 A | 11/2002 |
| JP | 2002-367142 A | 12/2002 |
| JP | 2002-367318 A | 12/2002 |
| JP | 2003-77116 A | 3/2003 |
| JP | 2003-323710 A | 11/2003 |
| JP | 2004-5793 A | 1/2004 |
| JP | 2004-005820 A | 1/2004 |
| JP | 2004-103186 A | 4/2004 |
| JP | 2004-114492 A | 4/2004 |
| JP | 2004-133997 A | 4/2004 |
| JP | 2004-185676 A | 7/2004 |
| JP | 2005-038579 A | 2/2005 |
| JP | 2005-092967 A | 4/2005 |
| JP | 2005-243063 A | 9/2005 |
| JP | 2005-243162 A | 9/2005 |
| JP | 2006-92672 A | 4/2006 |
| JP | 2006-286114 A | 10/2006 |
| JP | 2007-265555 A | 10/2007 |
| JP | 2007-273039 A | 10/2007 |
| JP | 2007-287310 A | 11/2007 |

(56) References Cited

FOREIGN PATENT DOCUMENTS

| JP | 2007-297427 A | 11/2007 |
|---|---|---|
| JP | 2007-305197 A | 11/2007 |
| JP | 2008-047276 A | 2/2008 |
| JP | 2008-243317 A | 10/2008 |
| JP | 2009-245515 A | 10/2009 |
| JP | 2009-283082 A | 12/2009 |
| JP | 2010-036350 A | 2/2010 |
| JP | 2010-49731 A | 3/2010 |
| JP | 2011-48878 A | 3/2011 |
| JP | 201 1-1 38566 A | 7/2011 |
| JP | 201 1-1 871 42 A | 9/2011 |
| JP | 2011-210288 A | 10/2011 |
| JP | 2011-225417 A | 11/2011 |
| JP | 2012-38367 A | 2/2012 |
| JP | 2012-043495 A | 3/2012 |
| JP | 2012-203955 A | 10/2012 |
| JP | 2013-25853 A | 2/2013 |
| JP | 2013-77360 A | 4/2013 |
| JP | 2013-164889 A | 8/2013 |
| JP | 2014-15453 A | 1/2014 |
| JP | 201 4-1 791 49 A | 9/2014 |
| JP | 2015-39801 A | 3/2015 |
| JP | 2015-111484 A | 6/2015 |
| JP | 2016-15183 A | 1/2016 |
| JP | 2016-502224 A | 1/2016 |
| JP | 2016-051493 A | 4/2016 |
| JP | 2016-071912 A | 5/2016 |
| JP | 2016-71926 A | 5/2016 |
| JP | 2016-126817 A | 7/2016 |
| JP | 2016-139451 A | 8/2016 |
| JP | 2016-177851 A | 10/2016 |
| JP | 2017-041291 A | 2/2017 |

OTHER PUBLICATIONS

U.S. Appl. No. 15/614,876, Patented as U.S. Pat. No. 10,431,248.
U.S. Appl. No. 15/620,916, Patented as U.S. Pat. No. 10,477,072.
U.S. Appl. No. 15/621,464, Patented as U.S. Pat. No. 10,431,249.
U.S. Appl. No. 15/626,720, Patented as U.S. Pat. No. 10,347,280.
U.S. Appl. No. 15/854,383, Patented as U.S. Pat. No. 10,438,628.
U.S. Appl. No. 15/854,507, Patented as U.S. Pat. No. 9,984,716.
U.S. Appl. No. 15/854,439, Patented as U.S. Pat. No. 10,482,915.
U.S. Appl. No. 15/854,506, Patented as U.S. Pat. No. 10,008,230.
U.S. Appl. No. 15/848,173, Patented as U.S. Pat. No. 10,403,320.
U.S. Appl. No. 15/628,814, Patented as U.S. Pat. No. 10,504,546.
U.S. Appl. No. 15/690,400, Patented as U.S. Pat. No. 10,529,368.
U.S. Appl. No. 15/690,906, Patented as U.S. Pat. No. 10,522,179.
U.S. Appl. No. 15/626,355, Patented as U.S. Pat. No. 10,510,369.
U.S. Appl. No. 15/627,696, Patented as U.S. Pat. No. 10,522,171.
U.S. Appl. No. 14/870,618, Patented as U.S. Pat. No. 9,959,894.
U.S. Appl. No. 15/388,911, Allowed.
U.S. Appl. No. 14/753,227, Patented as U.S. Pat. No. 9,601,146.
U.S. Appl. No. 15/380,309, Patented as U.S. Pat. No. 10,403,319.
U.S. Appl. No. 15/388,864, Patented as U.S. Pat. No. 9,773,519.
U.S. Appl. No. 15/072,550, Patented as U.S. Pat. No. 9,704,525.
U.S. Appl. No. 15/615,871, Patented as U.S. Pat. 5, 10,074,393.
U.S. Appl. No. 15/854,410, Patented as U.S. Pat. No. 9,972,351.
U.S. Appl. No. 15/378,907, Patented as U.S. Pat. No. 9,984,710.
U.S. Appl. No. 15/241,631, Patented as U.S. Pat. No. 10,026,435.
U.S. Appl. No. 14/209,065, Patented as U.S. Pat. No. 9,530,444.
U.S. Appl. No. 15/854,474, Patented as U.S. Pat. No. 9,978,414.
U.S. Appl. No. 15/854,403, Pending.
U.S. Appl. No. 15/241,297, Patented as U.S. Pat. No. 10,026,434.
U.S. Appl. No. 15/241,286, Patented as U.S. Pat. No. 10,026,4331.
U.S. Appl. No. 15/464,991, Patented as U.S. Pat. No. 9,779,772.
U.S. Appl. No. 14/867,752, Patented as U.S. Pat. No. 10,026,430.
U.S. Appl. No. 15/854,438, Patented as U.S. Pat. No. 10,373,633.
U.S. Appl. No. 15/854,409, Pending.
U.S. Appl. No. 15/443,026, Pending.
U.S. Appl. No. 15/920,782, Patented as U.S. Pat. No. 10,134,433.
U.S. Appl. No. 15/920,563, Patented as U.S. Pat. No. 10,360,937.
U.S. Appl. No. 15/920,533, Patented as U.S. Pat. No. 10,431,251.
U.S. Appl. No. 15/900,144, Patented as U.S. Pat. No. 10,497,384.
U.S. Appl. No. 15/900,080, Patented as U.S. Pat. No. 10,460,756.
U.S. Appl. No. 15/900,230, Patented as U.S. Pat. No. 10,431,250.
U.S. Appl. No. 15/900,164, Patented as U.S. Pat. No. 10,424,330.
U.S. Appl. No. 15/920,518, Allowed.
U.S. Appl. No. 15/899,587, Allowed.
U.S. Appl. No. 15/899,430, Patented as U.S. Pat. No. 10,403,314.
U.S. Appl. No. 15/920,515, Patented as U.S. Pat. No. 10,410,665.
U.S. Appl. No. 15/920,517, Patented as U.S. Pat. No. 10,395,685.
U.S. Appl. No. 15/920,538, Patented as U.S. Pat. No. 10,403,317.
U.S. Appl. No. 15/920,544, Patented as U.S. Pat. No. 10,410,666.
U.S. Appl. No. 15/920,768, Patented as U.S. Pat. No. 10,373,639.
U.S. Appl. No. 16/009,603, Patented as U.S. Pat. No. 10,366,721.
U.S. Appl. No. 16/182,083, Patented as U.S. Pat. No. 10,515,661.
U.S. Appl. No. 15/705,531, Pending.
U.S. Appl. No. 16/232,165, Patented as U.S. Pat. No. 10,510,366.
U.S. Appl. No. 16/100,289, Patented as U.S. Pat. No. 10,497,389.
U.S. Appl. No. 16/038,669, Pending.
U.S. Appl. No. 15/900,106, Patented as U.S. Pat. No. 10,438,624.
U.S. Appl. No. 15/900,412, Patented as U.S. Pat. No. 10,062,403[2].
U.S. Appl. No. 15/900,141, Allowed.
U.S. Appl. No. 15/900,160, Patented as U.S. Pat. No. 10,438,625.
U.S. Appl. No. 15/900,345, Patented as U.S. Pat. No. 10,482,913.
U.S. Appl. No. 15/900,379, Patented as U.S. Pat. No. 10,453,488.
U.S. Appl. No. 16/012,018, Pending.
U.S. Appl. No. 15/920,616, Patented as U.S. Pat. No. 10,438,623.
U.S. Appl. No. 15/900,242, Patented as U.S. Pat. No. 10,475,480.
U.S. Appl. No. 15/900,334, Patented as U.S. Pat. No. 10,438,621.
U.S. Appl. No. 15/920,592, Patented as U.S. Pat. No. 10,403,312.
U.S. Appl. No. 15/920,635, Patented as U.S. Pat. No. 10,170,144.
U.S. Appl. No. 16/160,377, Patented as U.S. Pat. No. 10,490,220.
U.S. Appl. No. 15/443,094, Pending.
U.S. Appl. No. 15/442,961, Pending.
U.S. Appl. No. 16/038,687, Pending.
U.S. Appl. No. 16/038,514, Pending.
U.S. Appl. No. 16/038,545, Pending.
U.S. Appl. No. 16/037,596, Pending.
U.S. Appl. No. 16/038,771, Pending.
U.S. Appl. No. 16/037,564, Pending.
U.S. Appl. No. 16/038,339, Patented as U.S. Pat. No. 10,403,316.
U.S. Appl. No. 16/037,573, Pending.
U.S. Appl. No. 16/037,681, Pending.
U.S. Appl. No. 16/038,884, Pending.
U.S. Appl. No. 16/038,847, Pending.
U.S. Appl. No. 16/044,574, Patented as U.S. Pat. No. 10,438,622.
U.S. Appl. No. 16/142,560, Pending.
U.S. Appl. No. 16/184,312, Patented as U.S. Pat. No. 10,497,386.
U.S. Appl. No. 16/143,646, Patented as U.S. Pat. No. 10,515,657.
U.S. Appl. No. 16/144,428, Pending.
U.S. Appl. No. 16/143,747, Pending.
U.S. Appl. No. 16/440,161, Pending.
U.S. Appl. No. 16/144,605, Pending.
U.S. Appl. No. 15/854,397, Pending.
U.S. Appl. No. 15/854,329, Patented as U.S. Pat. No. 9,984,712.
U.S. Appl. No. 14/838,663, Abandoned.
Advisory Action issued Jul. 5, 2018 in U.S. Appl. No. 14/838,663.
Office Action dated Apr. 26, 2017 which issued during the prosecution of U.S. Appl. No. 15/388,864.
Office Action dated Aug. 10, 2017, which issued during the prosecution of U.S. Appl. No. 14/870,618.
Office Action dated Aug. 3, 2018 which issued during the prosecution of U.S. Appl. No. 15/388,911.
Office Action dated Feb. 4, 2016 which issued during the prosecution of U.S. Appl. No. 14/753,227.
Office Action dated Jun. 7, 2018 which issued during the prosecution of U.S. Appl. No. 15/380,309.
Office Action dated May 2, 2018, which issued during the prosecution of U.S. Appl. No. 15/280,195.
Office Action dated May 4, 2018, which issued during the prosecution of U.S. Appl. No. 15/422,944.
Office Action dated May 4, 2018, which issued during the prosecution of U.S. Appl. No. 15/625,428.

(56) References Cited

OTHER PUBLICATIONS

Office Action dated May 7, 2018, which issued during the prosecution of U.S. Appl. No. 15/624,792.
Office Action dated May 7, 2018, which issued during the prosecution of U.S. Appl. No. 15/624,897.
Office Action dated May 7, 2018, which issued during the prosecution of U.S. Appl. No. 15/626,832.
Office Action dated Nov. 16, 2016 which issued during the prosecution of U.S. Appl. No. 15/072,550.
Office Action dated Oct. 12, 2018, which issued during the prosecution of U.S. Appl. No. 15/626,355.
Office Action dated Oct. 12, 2018, which issued during the prosecution of U.S. Appl. No. 15/627,696.
Office Action dated Oct. 15, 2018, which issued during the prosecution of U.S. Appl. No. 15/619,012.
Office Action dated Oct. 22, 2018, which issued during the prosecution of U.S. Appl. No. 15/854,439.
Office Action dated Oct. 9, 2018, which issued during the prosecution of U.S. Appl. No. 15/628,814.
Office Action dated Sep. 24, 2018, which issued during the prosecution of U.S. Appl. No. 15/690,400.
Office Action dated Sep. 27, 2018, which issued during the prosecution of U.S. Appl. No. 15/690,906.
Office Action dated Sep. 27, 2018, which issued during the prosecution of U.S. Appl. No. 15/854,383.
Office Action dated Aug. 23, 2018 from the United States Patent and Trademark Office in U.S. Appl. No. 15/614,876.
Office Action dated Aug. 23, 2018 from the United States Patent and Trademark Office in U.S. Appl. No. 15/621,464.
Office Action dated Aug. 23, 2018 from the United States Patent and Trademark Office in U.S. Appl. No. 15/626,720.
Office Action dated Aug. 24, 2018 from the United States Patent and Trademark Office in U.S. Appl. No. 15/620,916.
Office Action dated Aug. 3, 2018 from the United States Patent and Trademark Office in U.S. Appl. No. 15/380,336.
Office Action dated Dec. 5, 2016 from the United States Patent and Trademark Office in U.S. Appl. No. 14/978,834.
Office Action dated Dec. 6, 2016 from the United States Patent and Trademark Office in U.S. Appl. No. 14/757,555.
Office Action dated Jun. 9, 2017 which issued during the prosecution of U.S. Appl. No. 15/388,864.
Office Action dated May 30, 2018 which issued during the prosecution of U.S. Appl. No. 15/388,911.
Office Action dated Nov. 18, 2016 which issued during the prosecution of U.S. Appl. No. 14/753,227.
Office Action dated Aug. 15, 2016 which issued during the prosecution of U.S. Appl. No. 14/753,227.
"Introduction to TMR Magnetic Sensors", Anonymous, Mar. 12, 2015, MR Sensor Technology, pp. 1-5 (Year: 2015).
Notice of Allowance dated Apr. 25, 2017 which issued during the prosecution of U.S. Appl. No. 15/072,550.
Notice of Allowance dated Apr. 27, 2017, which issued during the prosecution of U.S. Appl. No. 15/052,115.
Notice of Allowance dated Apr. 5, 2018, which issued during the prosecution of U.S. Appl. No. 14/867,752.
Notice of Allowance dated Aug. 28, 2018 from the U.S. Patent & Trademark Office in U.S. Appl. No. 15/422,821.
Notice of Allowance dated Aug. 30, 2017, which issued during the prosecution of U.S. Appl. No. 15/466,143.
Notice of Allowance dated Aug. 6, 2018, which issued during the prosecution of U.S. Appl. No. 15/920,768.
Notice of Allowance dated Aug. 9, 2018, which issued during the prosecution of U.S. Appl. No. 15/920,563.
Notice of Allowance dated Dec. 2, 2016 which issued during the prosecution of U.S. Appl. No. 14/753,227.
Notice of Allowance dated Dec. 3, 2018, which issued during the prosecution of U.S. Appl. No. 15/920,518.
Notice of Allowance dated Dec. 4, 2018, which issued during the prosecution of U.S. Appl. No. 15/625,428.
Notice of Allowance dated Feb. 14, 2018, which issued during the prosecution of U.S. Appl. No. 14/870,618.
Notice of Allowance dated Jul. 12, 2017 which issued during the prosecution of U.S. Appl. No. 15/388,864.
Notice of Allowance dated Jul. 13, 2018, which issued during the prosecution of U.S. Appl. No. 15/920,782.
Notice of Allowance dated Jun. 2, 2017, which issued during the prosecution of U.S. Appl. No. 15/218,190.
Notice of Allowance dated Jun. 28, 2017, which issued during the prosecution of U.S. Appl. No. 15/464,991.
Notice of Allowance dated Mar. 14, 2018, which issued during the prosecution of U.S. Appl. No. 15/854,474.
Notice of Allowance dated Mar. 16, 2018 which issued during the prosecution of U.S. Appl. No. 15/854,410.
Notice of Allowance dated May 10, 2018 which issued during the prosecution of U.S. Appl. No. 15/615,871.
Notice of Allowance dated May 8, 2017, which issued during the prosecution of U.S. Appl. No. 14/757,555.
Notice of Allowance dated May 8, 2017, which issued during the prosecution of U.S. Appl. No. 14/978,834.
Notice of Allowance dated Oct. 11, 2018, which issued during the prosecution of U.S. Appl. No. 15/380,336.
Notice of Allowance dated Oct. 11, 2018, which issued during the prosecution of U.S. Appl. No. 15/422,944.
Notice of Allowance dated Oct. 11, 2018, which issued during the prosecution of U.S. Appl. No. 15/624,792.
Notice of Allowance dated Oct. 11, 2018, which issued during the prosecution of U.S. Appl. No. 15/624,897.
Notice of Allowance dated Oct. 12, 2018, which issued during the prosecution of U.S. Appl. No. 15/626,832.
Notice of Allowance dated Oct. 6, 2016, which issued during the prosecution of U.S. Appl. No. 14/209,065.
Notice of Allowance dated Sep. 24, 2018, which issued during the prosecution of U.S. Appl. No. 15/854,438.
Notice of Allowance dated Sep. 4, 2018, which issued during the prosecution of U.S. Appl. No. 15/625,428.
Notice of Allowance dated Apr. 16, 2019 in U.S. Appl. No. 15/625,428.
Notice of Allowance dated Apr. 30, 2019 in U.S. Appl. No. 15/380,309.
Notice of Allowance dated Aug. 27, 2018 in U.S. Appl. No. 15/920,635.
Notice of Allowance dated Jan. 10, 2019 in U.S. Appl. No. 15/848,173.
Notice of Allowance dated Jan. 17, 2019 in U.S. Appl. No. 15/422,944.
Notice of Allowance dated Jan. 17, 2019 in U.S. Appl. No. 15/626,720.
Notice of Allowance dated Jan. 30, 2019 in U.S. Appl. No. 15/854,409.
Notice of Allowance dated Jul. 16, 2019 in U.S. Appl. No. 15/900,144.
Notice of Allowance dated Jul. 31, 2019 in U.S. Appl. No. 16/100,289.
Notice of Allowance dated Jul. 31, 2019 in U.S. Appl. No. 16/143,646.
Notice of Allowance dated Jun. 25, 2019 in U.S. Appl. No. 15/620,916.
Notice of Allowance dated Jun. 27, 2019 in U.S. Appl. No. 15/854,439.
Notice of Allowance dated Jun. 6, 2019 in U.S. Appl. No. 15/854,383.
Notice of Allowance dated Mar. 13, 2019 in U.S. Appl. No. 16/100,289.
Notice of Allowance dated Mar. 14, 2018 in U.S. Appl. No. 15/854,329.
Notice of Allowance dated Mar. 18, 2019 in U.S. Appl. No. 15/626,355.
Notice of Allowance dated Mar. 18, 2019 in U.S. Appl. No. 15/628,814.
Notice of Allowance dated Mar. 5, 2019 in U.S. Appl. No. 16/009,603.
Notice of Allowance dated May 13, 2019 in U.S. Appl. No. 15/900,379.
Notice of Allowance dated May 14, 2019 in U.S. Appl. No. 15/422,821.
Notice of Allowance dated May 14, 2019 in U.S. Appl. No. 15/900,164.
Notice of Allowance dated May 15, 2019 in U.S. Appl. No. 15/900,106.
Notice of Allowance dated May 15, 2019 in U.S. Appl. No. 15/900,242.

(56) References Cited

OTHER PUBLICATIONS

Notice of Allowance dated May 16, 2019 in U.S. Appl. No. 15/614,876.
Notice of Allowance dated May 16, 2019 in U.S. Appl. No. 15/621,464.
Notice of Allowance dated May 24, 2019 in U.S. Appl. No. 15/900,345.
Notice of Allowance dated May 24, 2019 in U.S. Appl. No. 16/143,646.
Notice of Allowance dated May 28, 2019 in U.S. Appl. No. 15/920,616.
Notice of Allowance dated May 29, 2019 in U.S. Appl. No. 15/900,160.
Notice of Allowance dated May 29, 2019 in U.S. Appl. No. 15/900,334.
Notice of Allowance dated May 30, 2019 in U.S. Appl. No. 15/900,230.
Office Action dated Apr. 19, 2018, which issued during the prosecution of U.S. Appl. No. 15/854,438.
Office Action dated Dec. 14, 2018, which issued during the prosecution of U.S. Appl. No. 15/920,517.
Office Action dated Dec. 17, 2018, which issued during the prosecution of U.S. Appl. No. 15/920,515.
Office Action dated Dec. 17, 2018, which issued during the prosecution of U.S. Appl. No. 15/920,533.
Office Action dated Dec. 17, 2018, which issued during the prosecution of U.S. Appl. No. 15/920,538.
Office Action dated Dec. 17, 2018, which issued during the prosecution of U.S. Appl. No. 15/920,544.
Office Action dated Dec. 20, 2018, which issued during the prosecution of U.S. Appl. No. 15/900,164.
Office Action dated Dec. 21, 2018, which issued during the prosecution of U.S. Appl. No. 15/900,230.
Office Action dated Feb. 25, 2016, which issued during the prosecution of U.S. Appl. No. 14/867,752.
Office Action dated Jan. 27, 2015 from the Japanese Patent Office in Japanese Application No. 2013-053543 Machine Translation; corresponds to U.S. Appl. No. 14/209,065.
Office Action dated Jan. 31, 2018, which issued during the prosecution of U.S. Appl. No. 14/867,752.
Office Action dated Jul. 3, 2018, which issued during the prosecution of U.S. Appl. No. 15/920,518.
Office Action dated Jul. 6, 2015, which issued during the prosecution of U.S. Appl. No. 14/209,065.
Office Action dated Jul. 6, 2018 from the United States Patent and Trademark Office in U.S. Appl. No. 15/848,173.
Office Action dated Mar. 13, 2015, which issued during the prosecution of U.S. Appl. No. 14/209,065.
Office Action dated Mar. 16, 2017, which issued during the prosecution of U.S. Appl. No. 14/867,752.
Office Action dated Mar. 24, 2016, which issued during the prosecution of U.S. Appl. No. 14/209,065.
Office Action dated May 4, 2018 which issued during the prosecution of U.S. Appl. No. 15/422,821.
Office Action dated Nov. 28, 2018, which issued during the prosecution of U.S. Appl. No. 15/899,587.
Office Action dated Nov. 28, 2018, which issued during the prosecution of U.S. Appl. No. 15/900,080.
Office Action dated Nov. 28, 2018, which issued during the prosecution of U.S. Appl. No. 15/900,144.
Office Action dated Nov. 29, 2018, which issued during the prosecution of U.S. Appl. No. 15/380,309.
Office Action dated Nov. 29, 2018, which issued during the prosecution of U.S. Appl. No. 15/422,821.
Office Action dated Nov. 8, 2016 from the Japanese Patent Office in Japanese Application No. 2014-199022 Machine Translation corresponds to U.S. Appl. No. 14/867,752.
Office Action dated Oct. 15, 2018, which issued during the prosecution of U.S. Appl. No. 15/854,403.
Office Action dated Oct. 19, 2016, which issued during the prosecution of U.S. Appl. No. 14/867,752.
Office Action dated Oct. 3, 2018 from the United States Patent and Trademark Office in U.S. Appl. No. 15/280,195.
Office Action dated Sep. 10, 2015, which issued during the prosecution of U.S. Appl. No. 14/209,065.
Office Action dated Sep. 19, 2014, which issued during the prosecution of U.S. Appl. No. 14/209,065.
Office Action dated Sep. 26, 2017 issued by the Japanese Patent Office in JP Appln. No. 2014-265723 Machine Translation; corresponds to U.S. Appl. No. 14/978,834.
Office Action dated Sep. 26, 2017 issued by the Japanese Patent Office in JP Appln. No. 2015-249264 Machine Translation; corresponds to U.S. Appl. No. 14/757,555.
Office Action dated Sep. 28, 2018, which issued during the prosecution of U.S. Appl. No. 15/854,409.
Office Action dated Sep. 7, 2017, which issued during the prosecution of U.S. Appl. No. 14/867,752.
Office Action dated Apr. 15, 2019 in U.S. Appl. No. 16/182,083.
Office Action dated Apr. 16, 2019 in U.S. Appl. No. 16/232,165.
Office Action dated Apr. 23, 2019 in Japanese Application No. 2016-169851 Translation; Machine corresponds to U.S. Appl. No. 15/690,906.
Office Action dated Apr. 23, 2019 in Japanese Application No. 2016-182230 Translation; Machine corresponds to U.S. Appl. No. 15/705,531.
Office Action dated Aug. 23, 2019 in U.S. Appl. No. 15/854,409.
Office Action dated Aug. 25, 2017 in U.S. Appl. No. 14/838,663.
Office Action dated Aug. 27, 2019 in Japanese Application No. 2016-254428 Translation; Machine corresponds to U.S. Appl. No. 15/854,403.
Office Action dated Aug. 27, 2019 in Japanese Application No. 2016-254430 Translation; Machine corresponds to U.S. Appl. No. 15/854,409.
Office Action dated Aug. 27, 2019 in Japanese Application No. 2016-254432 Translation; Machine corresponds to U.S. Appl. No. 15/854,397.
Office Action dated Aug. 28, 2019 in U.S. Appl. No. 15/854,397.
Office Action dated Aug. 6, 2019 in Japanese Application No. 2016-254421 Translation; Machine corresponds to U.S. Appl. No. 15/854,383.
Office Action dated Aug. 6, 2019 in Japanese Application No. 2016-254427 Translation; Machine corresponds to U.S. Appl. No. 15/848,173.
Office Action dated Dec. 19, 2018 in U.S. Appl. No. 15/900,345.
Office Action dated Dec. 19, 2018 in U.S. Appl. No. 15/900,379.
Office Action dated Dec. 20, 2018 in U.S. Appl. No. 15/900,106.
Office Action dated Dec. 20, 2018 in U.S. Appl. No. 15/900,242.
Office Action dated Dec. 21, 2018 in U.S. Appl. No. 15/900,160.
Office Action dated Dec. 21, 2018 in U.S. Appl. No. 15/920,616.
Office Action dated Dec. 25, 2018 in Japanese Application No. 2015-245144 Translation; Machine corresponds to U.S. Appl. No. 15/378,907.
Office Action dated Dec. 25, 2018 in Japanese Application No. 2015-245145 Translation; Machine corresponds to U.S. Appl. No. 15/380,336.
Office Action dated Dec. 25, 2018 in Japanese Application No. 2015-254192 Translation; Machine corresponds to U.S. Pat. No. 9,773,519.
Office Action dated Dec. 27, 2018 in U.S. Appl. No. 15/900,334.
Office Action dated Dec. 31, 2018 in U.S. Appl. No. 16/009,603.
Office Action dated Dec. 7, 2018 in U.S. Appl. No. 15/920,592.
Office Action dated Feb. 11, 2016 in U.S. Appl. No. 14/838,663.
Office Action dated Feb. 21, 2019 in U.S. Appl. No. 15/854,383.
Office Action dated Feb. 26, 2019 in Japanese Application No. 2016-123207 Translation; Machine corresponds to U.S. Appl. No. 15/619,012.
Office Action dated Feb. 26, 2019 in U.S. Appl. No. 15/380,336.
Office Action dated Feb. 26, 2019 in U.S. Appl. No. 15/624,792.
Office Action dated Feb. 26, 2019 in U.S. Appl. No. 15/624,897.
Office Action dated Feb. 26, 2019 in U.S. Appl. No. 15/626,832.
Office Action dated Feb. 28, 2019 in U.S. Appl. No. 15/920,518.

(56) References Cited

OTHER PUBLICATIONS

Office Action dated Feb. 5, 2019 in Japanese Application No. 2016-117339 Translation; Machine corresponds to U.S. Appl. No. 16/100,289.
Office Action dated Feb. 5, 2019 in Japanese Application No. 2016-123205 Translation; Machine corresponds to U.S. Appl. No. 15/620,916.
Office Action dated Feb. 5, 2019 in Japanese Application No. 2016-169871 Translation; Machine corresponds to U.S. Appl. No. 15/690,400.
Office Action dated Feb. 5, 2019 in U.S. Appl. No. 16/038,339.
Office Action dated Feb. 7, 2019 in U.S. Appl. No. 15/621,464.
Office Action dated Jan. 10, 2019 in U.S. Appl. No. 15/899,430.
Office Action dated Jan. 29, 2019 in U.S. Appl. No. 15/614,876.
Office Action dated Jan. 30, 2019 in U.S. Appl. No. 15/620,916.
Office Action dated Jul. 16, 2019 in Japanese Application No. 2016-124933 Translation, Machine corresponds to U.S. Appl. No. 15/627,696.
Office Action dated Jun. 10, 2019 in U.S. Appl. No. 15/920,518.
Office Action dated Jun. 25, 2019 in Japanese Application No. 2015-245144 Translation; Machine corresponds to U.S. Appl. No. 15/378,907.
Office Action dated Jun. 6, 2019 in U.S. Appl. No. 15/899,587.
Office Action dated Mar. 15, 2018 in U.S. Appl. No. 14/838,663.
Office Action dated Mar. 15, 2019 in U.S. Appl. No. 15/280,195.
Office Action dated Mar. 15, 2019 in U.S Appl. No. 15/619,012.
Office Action dated Mar. 15, 2019 in U.S. Appl. No. 15/627,696.
Office Action dated Mar. 15, 2019 in U.S. Appl. No. 15/690,906.
Office Action dated Mar. 18, 2019 in U.S. Appl. No. 15/442,961.
Office Action dated Mar. 19, 2019 in Japanese Application No. 2016-116261 Translation; Machine corresponds to U.S. Appl. No. 15/614,876.
Office Action dated Mar. 19, 2019 in Japanese Application No. 2016-124515 Translation; Machine corresponds to U.S. Appl. No. 15/621,464.
Office Action dated Mar. 19, 2019 in Japanese Application No. 2016-124529 Translation; Machine corresponds to U.S. Appl. No. 15/628,814.
Office Action dated Mar. 19, 2019 in Japanese Application No. 2016-124932 Translation; Machine corresponds to U.S. Appl. No. 15/626,720.
Office Action dated Mar. 19, 2019 in Japanese Application No. 2016-124933 Translation; Machine corresponds to U.S. Appl. No. 15/627,696.
Office Action dated Mar. 19, 2019 in Japanese Application No. 2016-124935 Translation; Machine corresponds to U.S. Appl. No. 15/626,355.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
Office Action dated Mar. 30, 2017 in U.S. Appl. No. 14/838,663.
Office Action dated Mar. 5, 2019 in U.S. Appl. No. 15/443,026.
Office Action dated Mar. 5, 2019 in U.S. Appl. No. 15/854,397.
Office Action dated Mar. 6, 2019 in U.S. Appl. No. 15/854,403.
Office Action dated Mar. 7, 2019 in U.S. Appl. No. 15/854,439.
Office Action dated May 23, 2019 in U.S. Appl. No. 15/388,911.
Office Action dated Nov. 14, 2018 in U.S. Appl. No. 16/100,289.
Office Action dated Nov. 19, 2018 in U.S. Appl. No. 15/900,141.
Office Action dated Oct. 12, 2018 in U.S. Appl. No. 15/854,397.
Office Action dated Sep. 12, 2016 in U.S. Appl. No. 14/838,663.
Office Action dated Sep. 16, 2019 in U.S. Appl. No. 15/854,403.
Office Action dated Sep. 17, 2019 in Japanese Application No. 2017-029499 Translation; Machine corresponds to U.S. Appl. No. 15/900,106.
Office Action dated Sep. 19, 2019 in U.S. Appl. No. 15/443,026.
Office Action dated Sep. 20, 2019 in U.S. Appl. No. 15/442,961.
Office Action dated Sep. 24, 2019 in Japanese Application No. 2016-254436 Translation; Machine corresponds to U.S. Appl. No. 15/854,507.
Office Action dated Sep. 24, 2019 in Japanese Application No. 2016-254439 Translation; Machine corresponds to U.S. Appl. No. 16/232,165.
Office Action dated Sep. 24, 2019 in Japanese Application No. 2016-254441 Translation; Machine corresponds to U.S. Appl. No. 15/854,474.
Office Action dated Sep. 24, 2019 in Japanese Application No. 2016-254450 Translation; Machine corresponds to U.S. Appl. No. 15/854,410.
Office Action dated Sep. 24, 2019 in Japanese Application No. 2017-029491 Translation; Machine corresponds to U.S. Appl. No. 15/899,587.
Office Action dated Sep. 24, 2019 in Japanese Application No. 2017-029508 Translation; Machine corresponds to U.S. Appl. No. 15/900,345.
Office Action dated Sep. 24, 2019 in Japanese Application No. 2017-065730 Translation; Machine corresponds to U.S. Appl. No. 16/160,377.
Office Action dated Sep. 3, 2019 in Japanese Application No. 2016-254434 Translation, Machine corresponds to U.S. Appl. No. 15/854,329.
Office Action dated Oct. 1, 2019 in Japanese Application No. 2017-029495 Translation; Machine corresponds to U.S. Appl. No. 15/900,141.
Office Action dated Oct. 1, 2019 in Japanese Application No. 2017-029493 Translation; Machine corresponds to U.S. Appl. No. 15/900,144.
Office Action dated Oct. 1, 2019 in Japanese Application No. 2017-029494 Translation; Machine corresponds to U.S. Appl. No. 15/900,080.
Office Action dated Oct. 2, 2019 in U.S. Appl. No. 15/443,094.
Office Action dated Oct. 5, 2017 from the United States Patent and Trademark Office in U.S. Appl. No. 15/241,286.
Office Action dated Oct. 5, 2017 from the United States Patent and Trademark Office in U.S. Appl. No. 15/241,631.
Office Action dated Oct. 5, 2017 from the United States Patent and Trademark Office in U.S. Appl. No. 15/378,907.
Office Action dated Oct. 5, 2017 from the United States Patent and Trademark Office in U.S. Appl. No. 15/241,297.
Notice of Allowance dated Mar. 21, 2018 in U.S. Appl. No. 15/241,286.
Notice of Allowance dated Mar. 27, 2018 in U.S. Appl. No. 15/241,631.
Notice of Allowance dated Mar. 19, 2018 in U.S. Appl. No. 15/378,907.
Notice of Allowance dated Mar. 21, 2018 in U.S. Appl. No. 15/241,297.
Office Action dated Oct. 8, 2019 in Japanese Application No. 2017-029492 Translation; Machine corresponds to U.S. Appl. No. 15/899,430.
Office Action dated Oct. 8, 2019 in Japanese Application No. 2017-065700 Translation Machine corresponds to U.S. Appl. No. 15/920,544.
Office Action dated Oct. 8, 2019 in Japanese Application No. 2017-065708 Translation; Machine corresponds to U.S. Appl. No. 16/182,083.
Office Action dated Oct. 8, 2019 in Japanese Application No. 2017-065678 Translation; Machine corresponds to U.S. Appl. No. 15/920,538.
Office Action dated Oct. 10, 2019 in U.S. Appl. No. 15/705,531.
Office Action dated Oct. 9, 2019 in U.S. Appl. No. 16/440,161.
Notice of Allowance dated Oct. 17, 2019 in U.S. Appl. No. 15/388,911.
U.S. Appl. No. 15/422,821 Allowed; QPIDS filed.
U.S. Appl. No. 15/422,944, Patented as U.S. Pat. No. 10,347,279.
U.S. Appl. No. 15/619,012, Allowed.
U.S. Appl. No. 15/624,897, Allowed.
U.S. Appl. No. 15/624,792, Allowed.
U.S. Appl. No. 15/626,832, Allowed.
U.S. Appl. No. 15/380,336, Allowed.
U.S. Appl. No. 15/620,916, Allowed.
U.S. Appl. No. 15/854,439, Allowed.
U.S. Appl. No. 15/628,814, Allowed.

(56) References Cited

OTHER PUBLICATIONS

U.S. Appl. No. 15/690,400, Allowed.
U.S. Appl. No. 15/690,906, Allowed.
U.S. Appl. No. 15/626,355, Allowed.
U.S. Appl. No. 15/627,696, Allowed.
U.S. Appl. No. 14/870,618, Patented as U.S. Appl. No. 9,959,894.
U.S. Appl. No. 15/900,144, Allowed.
U.S. Appl. No. 15/899,587, Pending.
U.S. Appl. No. 16/182,083, Allowed (Continuation of U.S. Appl. No. 15/920,768).
U.S. Appl. No. 16/232,165, Allowed (Continuation of U.S. Appl. No. 15/854,438).
U.S. Appl. No. 16/100,289, Allowed.
U.S. Appl. No. 15/900,345, Allowed; QPIDS filed.
U.S. Appl. No. 15/900,242, Allowed.
U.S. Appl. No. 16/160,377, Allowed.
U.S. Appl. No. 16/037,564 (the present Application), Pending.
U.S. Appl. No. 16/184,312, Allowed.
U.S. Appl. No. 16/143,646, Allowed.
Office Action dated Jan. 28, 2020 in U.S. Appl. No. 15/442,961.
Notice of Allowance dated Feb. 7, 2020 in U.S. Appl. No. 16/440,161.
Notice of Allowance dated Feb. 20, 2020 in U.S. Appl. No. 15/705,531.
Office Action dated Feb. 21, 2020 in U.S. Appl. No. 16/038,514.
Office Action dated Mar. 10, 2020 in U.S. Appl. No. 16/038,545.
Office Action dated Mar. 10, 2020 in U.S. Appl. No. 16/037,596.
Office Action dated Mar. 10, 2020 in U.S. Appl. No. 16/038,771.
Office Action dated Mar. 10, 2020 in U.S. Appl. No. 16/037,681.
Office Action dated Mar. 10, 2020 in U.S. Appl. No. 16/038,884.
Office Action dated Mar. 10, 2020 in U.S. Appl. No. 16/038,847.
Office Action dated Mar. 10, 2020 in U.S. Appl. No. 16/142,560.
Office Action dtaed Mar. 10, 2020 in U.S. Appl. No. 16/144,428.
Office Action dated Mar. 10, 2020 in U.S. Appl. No. 16/143,747.
Office Action dated Mar. 10, 2020 in U.S. Appl. No. 16/038,687.
Office Action dated Dec. 10, 2019 in Japanese Application No. 2016-254428 Machine Translation; corresponds to U.S. Appl. No. 15/854,403.
Office Action dated Dec. 17, 2019 in Japanese Application No. 2016-254430 English Translation; corresponds to U.S. Appl. No. 15/854,409.
Office Action dated Dec. 17, 2019 in Japanese Application No. 2016-254432 English Translation; corresponds to U.S. Appl. No. 15/854,397.
Office Action dated Dec. 17, 2019 in Japanese Application No. 2017-029507 English Translation; corresponds to U.S. Appl. No. 15/900,242.
Office Action dated Dec. 24, 2019 in Japanese Application No. 2016-254434 English Translation; corresponds to U.S. Appl. No. 15/854,329.
Office Action dated Dec. 24, 2019 in Japanese Application No. 2017-029510 English Translation; corresponds to U.S. Appl. No. 15/900,230.
Office Action dated Nov. 26, 2019 in Japanese Application No. 2016-254421 Machine Translation; corresponds to U.S. Appl. No. 15/854,383.
Office Action dated Nov. 26, 2019 in Japanese Application No. 2017-029496 Machine Translation; corresponds to U.S. Appl. No. 16/044,574.
Office Action dated Nov. 26, 2019 in Japanese Application No. 2017-029502 Machine Translation; corresponds to U.S. Appl. No. 15/900,379.
Office Action dated Nov. 26, 2019 in Japanese Application No. 2017-065694 Machine Translation; corresponds to U.S. Appl. No. 15/920,518.
Advisory Action dated Jan. 17, 2020 in U.S. Appl. No. 15/443,094.
Office Action dated Mar. 10, 2020 in U.S. Appl. No. 16/037,573.
Office Action dated Mar. 13, 2020 in U.S. Appl. No. 16/038,669.
Office Action dated Mar. 13, 2020 in U.S. Appl. No. 16/144,605.

* cited by examiner

MAGNETIC RECORDING MEDIUM HAVING CHARACTERIZED MAGNETIC LAYER

CROSS-REFERENCE TO RELATED APPLICATIONS

This application claims priority under 35 U.S.C 119 to Japanese Patent Application No. 2017-140015 filed on Jul. 19, 2017. The above application is hereby expressly incorporated by reference, in its entirety, into the present application.

BACKGROUND OF THE INVENTION

1. Field of the Invention

The present invention relates to a magnetic recording medium.

2. Description of the Related Art

Generally, either or both of the recording of information on a magnetic recording medium and the reproduction of information performed by causing a magnetic head (hereinafter, simply described as "head" as well) to contact and slide on a surface of the magnetic recording medium (a surface of a magnetic layer).

In order to continuously or intermittently repeat the reproduction of the information recorded on the magnetic recording medium, the head is caused to repeatedly slide on the surface of the magnetic layer (repeated sliding). For improving the reliability of the magnetic recording medium as a recording medium for data storage, it is desirable to inhibit the deterioration of electromagnetic conversion characteristics during the repeated sliding. This is because a magnetic recording medium in which the electromagnetic conversion characteristics thereof hardly deteriorate during the repeated sliding can keep exhibiting excellent electromagnetic conversion characteristics even though the reproduction is continuously or intermittently repeated.

Examples of causes of the deterioration of electromagnetic conversion characteristics during the repeated sliding include the occurrence of a phenomenon (referred to as "spacing loss") in which a distance between the surface of the magnetic layer and the head increases. Examples of causes of the spacing loss include a phenomenon in which while reproduction is being repeated and the head is continuously sliding on the surface of the magnetic layer, foreign substances derived from the magnetic recording medium are attached to the head. In the related art, as a countermeasure for the head attachment occurring as above, an abrasive has been added to the magnetic layer such that the surface of the magnetic layer performs a function of removing the head attachment (for example, see JP2005-243162A).

SUMMARY OF THE INVENTION

It is preferable to add an abrasive to the magnetic layer, because then it is possible to inhibit the deterioration of the electromagnetic conversion characteristics resulting from the spacing loss that occurs due to the head attachment. Incidentally, in a case where the deterioration of the electromagnetic conversion characteristics can be suppressed to a level that is higher than the level achieved by the addition of an abrasive to the magnetic layer as in the related art, it is possible to further improve the reliability of the magnetic recording medium as a recording medium for data storage.

The present invention is based on the above circumstances, and an aspect of the present invention provides for a magnetic recording medium in which the electromagnetic conversion characteristics thereof hardly deteriorate even though a head repeatedly slides on a surface of a magnetic layer.

An aspect of the present invention is a magnetic recording medium comprising a non-magnetic support and a magnetic layer which is provided on the support and contains ferromagnetic powder and a binder, in which the ferromagnetic powder is ferromagnetic hexagonal ferrite powder, the magnetic layer contains an abrasive, an intensity ratio (Int (110)/Int (114)) (hereinafter, described as "XRD (X-ray diffraction) intensity ratio" as well) of a peak intensity Int (110) of a diffraction peak of (110) plane of a crystal structure of the hexagonal ferrite, determined by performing X-ray diffraction analysis on the magnetic layer by using an In-Plane method, to a peak intensity Int (114) of a diffraction peak of (114) plane of the crystal structure is equal to or higher than 0.5 and equal to or lower than 4.0, a squareness ratio of the magnetic recording medium in a vertical direction is equal to or higher than 0.65 and equal to or lower than 1.00, and a contact angle with 1-bromonaphthalene (hereinafter, described as "1-bromonaphthalene contact angle of the magnetic layer" or simply described as "1-bromonaphthalene contact angle" as well) measured within a surface of the magnetic layer is in a range of 50.0° to 55.0°.

In one aspect, the squareness ratio in a vertical direction may be equal to or higher than 0.65 and equal to or lower than 0.90.

In one aspect, the magnetic recording medium may further comprise a non-magnetic layer containing non-magnetic powder and a binder between the non-magnetic support and the magnetic layer.

In one aspect, the magnetic recording medium may further comprise a back coating layer containing non-magnetic powder and a binder on a surface, which is opposite to a surface provided with the magnetic layer, of the non-magnetic support.

In one aspect, the magnetic recording medium may be a magnetic tape.

According to an aspect of the present invention, it is possible to provide a magnetic recording medium in which the electromagnetic conversion characteristics thereof hardly deteriorate even though a head is caused to repeatedly slide on a surface of a magnetic layer.

DESCRIPTION OF THE PREFERRED EMBODIMENTS

An aspect of the present invention is a magnetic recording medium including a non-magnetic support and a magnetic layer which is provided on the support and contains ferromagnetic powder and a binder, in which the ferromagnetic powder is ferromagnetic hexagonal ferrite powder, the magnetic layer contains an abrasive, an intensity ratio (Int (110)/Int (114)) of a peak intensity Int (110) of a diffraction peak of (110) plane of a crystal structure of the hexagonal ferrite, determined by performing X-ray diffraction analysis on the magnetic layer by using an In-Plane method, to a peak intensity Int (114) of a diffraction peak of (114) plane of the crystal structure is equal to or higher than 0.5 and equal to or lower than 4.0, a squareness ratio of the magnetic recording medium in a vertical direction is equal to or higher than 0.65 and equal to or lower than 1.00, and a contact angle with 1-bromonaphthalene measured within a surface of the magnetic layer is in a range of 50.0° to 55.0°.

In the present invention and the present specification, "surface of the magnetic layer" refers to a surface of the magnetic recording medium on the magnetic layer side.

Furthermore, in the present invention and the present specification, "ferromagnetic hexagonal ferrite powder" refers to an aggregate of a plurality of ferromagnetic hexagonal ferrite particles. The ferromagnetic hexagonal ferrite particles are ferromagnetic particles having a hexagonal ferrite crystal structure. Hereinafter, the particles constituting the ferromagnetic hexagonal ferrite powder (ferromagnetic hexagonal ferrite particles) will be described as "hexagonal ferrite particles" or simply as "particles" as well. "Aggregate" is not limited to an aspect in which the particles constituting the aggregate directly contact each other, and also includes an aspect in which a binder, an additive, or the like is interposed between the particles.

The same points as described above will also be applied to various powders such as non-magnetic powder in the present invention and the present specification.

In the present invention and the present specification, unless otherwise specified, the description relating to a direction and an angle (for example, "vertical", "orthogonal", or "parallel") includes a margin of error accepted in the technical field to which the present invention belongs. For example, the aforementioned margin of error means a range less than a precise angle±10°. The margin of error is preferably within a precise angle±5°, and more preferably within a precise angle±3°.

Regarding the aforementioned magnetic recording medium, the inventors of the present invention made assumptions as below.

The magnetic layer of the magnetic recording medium contains an abrasive. The addition of the abrasive to the magnetic layer enables the surface of the magnetic layer to perform a function of removing the head attachment. However, it is considered that in a case where the abrasive present on the surface of the magnetic layer and/or in the vicinity of the surface of the magnetic layer fails to appropriately permeate the inside of the magnetic layer by the force applied thereto from the head when the head is sliding on the surface of the magnetic layer, the head will be scraped by contacting the abrasive protruding from the surface of the magnetic layer (head scraping). It is considered that in a case where the head scraping that occurs as above can be inhibited, it is possible to further inhibit the deterioration of the electromagnetic conversion characteristics caused by the spacing loss.

Regarding the aforementioned point, the inventors of the present invention assume that in the ferromagnetic hexagonal ferrite powder contained in the magnetic layer include particles (hereinafter, referred to as "former particles") which exert an influence on the degree of permeation of the abrasive by supporting the abrasive pushed into the inside of the magnetic layer and particles (hereinafter, referred to as "latter particles") which are considered not to exert such an influence or to exert such an influence to a small extent. It is considered that the latter particles are fine particles resulting from partial chipping of particles due to the dispersion treatment performed at the time of preparing a composition for forming a magnetic layer, for example. The inventors of the present invention also assume that the more the fine particles contained in the magnetic layer, the further the hardness of the magnetic layer decreases, although the reason is unclear. In a case where the hardness of the magnetic layer decreases, the surface of the magnetic layer is scraped when the head slides on the surface of the magnetic layer (magnetic layer scraping), the foreign substances occurring due to the scraping are interposed between the surface of the magnetic layer and the head, and as a result, spacing loss occurs.

The inventors of the present invention consider that in the ferromagnetic hexagonal ferrite powder present in the magnetic layer, the former particles are particles resulting in a diffraction peak in X-ray diffraction analysis using an In-Plane method, and the latter particles do not result in a diffraction peak or exert a small influence on a diffraction peak because they are fine. Therefore, the inventors of the present invention assume that based on the intensity of the diffraction peak determined by X-ray diffraction analysis performed on the magnetic layer by using the In-Plane method, the way the particles, which support the abrasive pushed into the inside of the magnetic layer and exert an influence on the degree of permeation of the abrasive, are present in the magnetic layer can be controlled, and as a result, the degree of permeation of the abrasive can be controlled. The inventors of the present invention consider that the XRD intensity ratio, which will be specifically described later, is a parameter relating to the aforementioned point.

Meanwhile, the squareness ratio in a vertical direction is a ratio of remnant magnetization to saturation magnetization measured in a direction perpendicular to the surface of the magnetic layer. The smaller the remnant magnetization, the lower the ratio.

Presumably, it is difficult for the latter particles to retain magnetization because they are fine. Therefore, presumably, as the amount of the latter particles contained in the magnetic layer increases, the squareness ratio in a vertical direction tends to be reduced. Accordingly, the inventors of the present invention consider that the squareness ratio in a vertical direction can be a parameter of the amount of the fine particles (the latter particles described above) present in the magnetic layer. The inventors of the present invention consider that as the amount of such fine particles contained in the magnetic layer increases, the hardness of the magnetic layer may decrease, and accordingly, the surface of the magnetic layer may be scraped when the head slides on the surface of the magnetic layer, the foreign substances that occur due to the scraping may be interposed between the surface of the magnetic layer and the head, and hence the spacing loss strongly tends to occur.

The inventors of the present invention consider that in the aforementioned magnetic recording medium, each of the XRD intensity ratio and the squareness ratio in a vertical direction is in the aforementioned range, and this makes a contribution to the inhibition of the deterioration of the electromagnetic conversion characteristics during the repeated sliding. According to the inventors of the present invention, presumably, this is because the control of the XRD intensity ratio mainly makes it possible to inhibit the head scraping, and the control of the squareness ratio in a vertical direction mainly makes it possible to inhibit the magnetic layer scraping.

The inventors of the present invention consider that, in the magnetic recording medium, an aspect in which the 1-bromonaphthalene contact angle of the magnetic layer is in a range of 50.0° to 55.0° makes a contribution to the further inhibition of the deterioration of electromagnetic conversion characteristics during the repeated sliding. This point will be further described below.

In the present invention and the present specification, the contact angle with 1-bromonaphthalene measured within a surface of the magnetic layer is a value measured by a sessile drop method. Specifically, the 1-bromonaphthalene contact angle refers to the arithmetic mean of values obtained by measuring the contact angle six times for a certain sample by a θ/2 method in a measurement environment with an atmospheric temperature of 25° C. and a relative humidity of 25%. An example of specific aspects of the measurement conditions will be described later in examples.

The inventors of the present invention consider that the aspect, in which the 1-bromonaphthalene contact angle of the magnetic layer of the magnetic recording medium is in a range of 50.0° to 55.0°, makes a contribution to the smooth sliding (improvement of sliding) of the head on the surface of the magnetic layer. It is considered that in a case where the sliding can be improved, it is possible to inhibit the magnetic layer scraping from occurring by the damage of the surface of the magnetic layer when the head slides on the surface of the magnetic layer. The inventors of the present invention assume that the inhibition of the occurrence of the magnetic layer scraping may lead to the inhibition of the deterioration of electromagnetic conversion characteristics that is caused during the repeated sliding by the occurrence of spacing loss resulting from foreign substances generated by the magnetic layer scraping. Furthermore, regarding the improvement of sliding described above, the inventors of the present invention consider that controlling the affinity between the surface of the magnetic layer and the head makes a contribution to the improvement of sliding. Furthermore, the inventors of the present invention assume that the 1-bromonaphthalene contact angle may be a value that can be a parameter for controlling the aforementioned affinity. This point will be further described below.

The affinity between the surface of the magnetic layer and the head is considered to be affected by the surface free energy of the surface of the magnetic layer. According to the Kitazaki-Hata theory (three liquid method) relating to the surface free energy, the surface free energy can be obtained as the sum of a dispersion component, a hydrogen bonding component, and a polarization component. Here, it is considered that on the surface free energy, which is measured within the surface of the magnetic layer of the magnetic recording medium by using the three liquid method, due to the physical properties of the components constituting the magnetic layer, the dispersion component exerts a predominant influence among the three components described above. Therefore, presumably, the dispersion component may mainly make a contribution to the affinity between the surface of the magnetic layer and the head.

Regarding this point, the inventors of the present invention consider that, for 1-bromonaphthalene, because the dispersion component exerts a predominant influence on the surface free energy, the 1-bromonaphthalene contact angle can be a parameter of the affinity of the surface of the magnetic layer with the head. The surface of the magnetic layer in which the 1-bromonaphthalene contact angle is in a range of 50.0° to 55.0° is considered to exhibit excellent affinity with the head. The inventors of the present invention assume that the excellent affinity exhibited in this way may make a contribution to the smooth sliding of the head on the surface of the magnetic layer. However, this is merely an assumption, and the present invention is not limited thereto.

The points described so far are assumptions that the inventors of the present invention made regarding the mechanism which makes it possible to inhibit the deterioration of the electromagnetic conversion characteristics in the magnetic recording medium even though the head repeatedly slides on the surface of the magnetic layer. However, the present invention is not limited to the assumption. The present specification includes the assumption of the inventors of the present invention, and the present invention is not limited to the assumption.

Hereinbelow, various values will be more specifically described.

XRD Intensity Ratio

In the magnetic recording medium, the magnetic layer contains ferromagnetic hexagonal ferrite powder. The XRD intensity ratio is determined by performing X-ray diffraction analysis on the magnetic layer containing the ferromagnetic hexagonal ferrite powder by using an In-Plane method. Hereinafter, the X-ray diffraction analysis performed using an In-Plane method will be described as "In-Plane XRD" as well. In-Plane XRD is performed by irradiating the surface of the magnetic layer with X-rays by using a thin film X-ray diffractometer under the following conditions. Magnetic recording media are roughly classified into a tape-like magnetic recording medium (magnetic tape) and a disc-like magnetic recording medium (magnetic disc). The magnetic tape is measured in a longitudinal direction, and the magnetic disc is measured in a radius direction.

Radiation source used: Cu radiation (power of 45 kV, 200 mA)

Scan condition: 0.05 degree/step within a range of 20 to 40 degree, 0.1 degree/min Optical system used: parallel optical system Measurement method: 2 Ox scan (X-ray incidence angle: 0.250)

The above conditions are values set in the thin film X-ray diffractometer. As the thin film X-ray diffractometer, known instruments can be used. As one of the thin film X-ray diffractometers, SmartLab manufactured by Rigaku Corporation can be exemplified. The sample used for In-Plane XRD analysis is not limited in terms of the size and shape, as long as it is a medium sample which is cut from a magnetic recording medium to be measured and enables the confirmation of a diffraction peak which will be described later.

Examples of the techniques of X-ray diffraction analysis include thin film X-ray diffraction and powder X-ray diffraction. By the powder X-ray diffraction, the X-ray diffraction of a powder sample is measured. In contrast, by the thin film X-ray diffraction, it is possible to measure the X-ray diffraction of a layer formed on a substrate and the like. The thin film X-ray diffraction is classified into an In-Plane method and an Out-Of-Plane method. In the Out-Of-Plane method, the X-ray incidence angle during measurement is within a range of 5.00° to 90.00°. In contrast, in the In-Plane method, the X-ray incidence angle is generally within a range of 0.20° to 0.50°. In the present invention and the present specification, the X-ray incidence angle in In-Plane XRD is set to be 0.25° as described above. In the In-Plane method, the X-ray incidence angle is smaller than in the Out-Of-Plane method, and hence the X-ray permeation depth is small. Accordingly, by the X-ray diffraction analysis (In-Plane XRD) using the In-Plane method, it is possible to analyze the X-ray diffraction of a surface layer portion of a sample to be measured. For the sample of the magnetic recording medium, the X-ray diffraction of the magnetic layer can be analyzed by In-Plane XRD. In an X-ray diffraction spectrum obtained by the aforementioned In-Plane XRD, the aforementioned XRD intensity ratio is an intensity ratio (Int (110)/Int (114)) of a peak intensity Int (110) of a diffraction peak of (110) plane of a crystal structure of the hexagonal ferrite to a peak intensity Int (114) of a diffraction peak of (114) plane of the crystal structure. Int is used as the abbreviation of intensity. In the X-ray diffraction spectrum obtained by In-Plane XRD (ordinate:

intensity, abscissa: diffraction angle 2 Ox (degree)), the diffraction peak of (114) plane is a peak detected at 2 $\theta_\chi$ that is within a range of 33 to 36 degree, and the diffraction peak of (110) plane is a peak detected at 2 $\theta_\chi$ that is within a range of 29 to 32 degree.

Among diffraction planes, (114) plane of the crystal structure of the hexagonal ferrite is positioned close to a direction of a magnetization easy axis (c-axis direction) of the particles of the ferromagnetic hexagonal ferrite powder (hexagonal ferrite particles). The (110) plane of the hexagonal ferrite crystal structure is positioned in a direction orthogonal the direction of the magnetization easy axis.

Regarding the aforementioned former particles among the hexagonal ferrite particles contained in the magnetic layer, the inventors of the present invention considered that the more the direction of the particles orthogonal to the magnetization easy axis is parallel to the surface of the magnetic layer, the more difficult it is for the abrasive to permeate the inside of the magnetic layer by being supported by the hexagonal ferrite particles. In contrast, regarding the former particles in the magnetic layer, the inventors of the present invention consider that the more the direction of the particles orthogonal to the magnetization easy axis is perpendicular to the surface of the magnetic layer, the easier it is for the abrasive to permeate the inside of the magnetic layer because it is difficult for the abrasive to be supported by the hexagonal ferrite powder. Furthermore, the inventors of the present invention assume that in the X-ray diffraction spectra determined by In-Plane XRD, in a case where the intensity ratio (Int (110)/Int (114); XRD intensity ratio) of the peak intensity Int (110) of the diffraction peak of (110) plane to the peak intensity Int (114) of the diffraction peak of (114) plane of the hexagonal ferrite crystal structure is high, it means that the magnetic layer contains a large amount of the former particles whose direction orthogonal to the direction of the magnetization easy axis is more parallel to the surface of the magnetic layer; and in a case where the XRD intensity ratio is low, it means that the magnetic layer contains a small amount of such former particles. In addition, the inventors consider that in a case where the XRD intensity ratio is equal to or lower than 4.0, it means that the former particles, that is, the particles, which support the abrasive pushed into the inside of the magnetic layer and exert an influence on the degree of the permeation of the abrasive, merely support the abrasive, and as a result, the abrasive can appropriately permeate the inside of the magnetic layer at the time when a head slides on the surface of the magnetic layer. The inventors of the present invention assume that the aforementioned mechanism may make a contribution to hinder the occurrence of the head scraping even though the head repeatedly slides on the surface of the magnetic layer. In contrast, the inventors of the present invention consider that the state in which the abrasive appropriately protrudes from the surface of the magnetic layer when the head slides on the surface of the magnetic layer may make a contribution to the reduction of the contact area (real contact) between the surface of the magnetic layer and the head. The inventors consider that the larger the real contact area, the stronger the force applied to the surface of the magnetic layer from the head when the head slides on the surface of the magnetic layer, and as a result, the surface of the magnetic layer is damaged and scraped. Regarding this point, the inventors of the present invention assume that in a case where the XRD intensity ratio is equal to or higher than 0.5, it shows that the aforementioned former particles are present in the magnetic layer in a state of being able to support the abrasive with allowing the abrasive to appropriately protrude from the surface of the magnetic layer when the head slides on the surface of the magnetic layer.

From the viewpoint of further inhibiting the deterioration of the electromagnetic conversion characteristics, the XRD intensity ratio is preferably equal to or lower than 3.5, and more preferably equal to or lower than 3.0. From the same viewpoint, the XRD intensity ratio is preferably equal to or higher than 0.7, and more preferably equal to or higher than 1.0.

The XRD intensity ratio can be controlled by the treatment conditions of the alignment treatment performed in the manufacturing process of the magnetic recording medium. As the alignment treatment, it is preferable to perform a vertical alignment treatment. The vertical alignment treatment can be preferably performed by applying a magnetic field in a direction perpendicular to a surface of the wet (undried) coating layer of the composition for forming a magnetic layer. The further the alignment conditions are strengthened, the higher the XRD intensity ratio tends to be. Examples of the treatment conditions of the alignment treatment include the magnetic field intensity in the alignment treatment and the like. The treatment conditions of the alignment treatment are not particularly limited, and may be set such that an XRD intensity ratio of equal to or higher than 0.5 and equal to or lower than 4.0 can be achieved. For example, the magnetic field intensity in the vertical alignment treatment can be set to be 0.10 to 0.80 T or 0.10 to 0.60 T. As the dispersibility of the ferromagnetic hexagonal ferrite powder in the composition for forming a magnetic layer is improved, the value of the XRD intensity ratio tends to increase by the vertical alignment treatment.

Squareness Ratio in Vertical Direction

The squareness ratio in a vertical direction is a squareness ratio measured in a vertical direction of the magnetic recording medium. "Vertical direction" described regarding the squareness ratio refers to a direction orthogonal to the surface of the magnetic layer. For example, in a case where the magnetic recording medium is a tape-like magnetic recording medium, that is, a magnetic tape, the vertical direction is a direction orthogonal to a longitudinal direction of the magnetic tape. The squareness ratio in a vertical direction is measured using a vibrating sample fluxmeter. Specifically, in the present invention and the present specification, the squareness ratio in a vertical direction is a value determined by carrying out scanning in the vibrating sample fluxmeter by applying a maximum external magnetic field of 1,194 kA/m (15 kOe) as an external magnetic field to the magnetic recording medium, at a measurement temperature of 23° C.±1° C. under the condition of a scan rate of 4.8 kA/m/sec (60 Oe/sec), which is used after being corrected for a demagnetizing field. The measured squareness ratio is a value from which the magnetization of a sample probe of the vibrating sample fluxmeter is subtracted as background noise.

The squareness ratio in a vertical direction of the magnetic recording medium is equal to or higher than 0.65. The inventors of the present invention assume that the squareness ratio in a vertical direction of the magnetic recording medium can be a parameter of the amount of the aforementioned latter particles (fine particles) present in the magnetic layer that are considered to induce the reduction in the hardness of the magnetic layer. It is considered that the magnetic layer in the magnetic recording medium having a squareness ratio in a vertical direction of equal to or higher than 0.65 has high hardness because of containing a small amount of such fine particles and is hardly scraped by the sliding of the head on the surface of the magnetic layer.

Presumably, because the surface of the magnetic layer is hardly scraped, it is possible to inhibit the electromagnetic conversion characteristics from deteriorating due to the occurrence of spacing loss resulting from foreign substances that occur due to the scraping of the surface of the magnetic layer. From the viewpoint of further inhibiting the deterioration of the electromagnetic conversion characteristics, the squareness ratio in a vertical direction is preferably equal to or higher than 0.68, more preferably equal to or higher than 0.70, even more preferably equal to or higher than 0.73, and still more preferably equal to or higher than 0.75. In principle, the squareness ratio is 1.00 at most. Accordingly, the squareness ratio in a vertical direction of the magnetic recording medium is equal to or lower than 1.00. The squareness ratio in a vertical direction may be equal to or lower than 0.95, 0.90, 0.87, or 0.85, for example. The larger the value of the squareness ratio in a vertical direction, the smaller the amount of the aforementioned fine latter particles in the magnetic layer. Therefore, it is considered that from the viewpoint of the hardness of the magnetic layer, the value of the squareness ratio is preferably large. Accordingly, the squareness ratio in a vertical direction may be higher than the upper limit exemplified above.

The inventors of the present invention consider that in order to obtain a squareness ratio in a vertical direction of equal to or higher than 0.65, it is preferable to inhibit fine particles from occurring due to partial chipping of particles in the step of preparing the composition for forming a magnetic layer. Specific means for inhibiting the occurrence of chipping will be described later.

1-Bromonaphthalene Contact Angle of Magnetic Layer

The 1-bromonaphthalene contact angle measured within a surface of the magnetic layer of the magnetic recording medium is in a range of 50.0° to 55.0°. Presumably, the aspect in which the 1-bromonaphthalene contact angle is in the above range may make a contribution to the improvement of the sliding of the head on the surface of the magnetic layer, and as a result, the deterioration of electromagnetic conversion characteristics during the repeated sliding may be inhibited. From the viewpoint of further inhibiting the deterioration of electromagnetic conversion characteristics, the 1-bromonaphthalene contact angle of the magnetic layer is preferably equal to or greater than 50.5°, more preferably equal to or greater than 51.0°, even more preferably equal to or greater than 51.5°, still more preferably equal to or greater than 52.0°, and yet more preferably equal to or greater than 52.5°. From the viewpoint of ease of manufacturing and the like, the 1-bromonaphthalene contact angle of the magnetic layer is preferably equal to or smaller than 54.5°, and more preferably equal to or smaller than 54.0°.

The 1-bromonaphthalene contact angle of the magnetic layer can be controlled by using a component which can adjust the 1-bromonaphthalene contact angle (hereinafter, referred to as "1-bromonaphthalene contact angle adjusting component" as well) and adjusting the content of such a component. For example, by using a component, which can function to increase the value of the 1-bromonaphthalene contact angle, as the 1-bromonaphthalene contact angle adjusting component and increasing the content of the component, the value of the 1-bromonaphthalene contact angle can be increased.

1-Bromonaphthalene Contact Angle Adjusting Component

The 1-bromonaphthalene contact angle adjusting component is a component which can adjust the 1-bromonaphthalene contact angle measured within the surface of the magnetic layer. "Can adjust" means that the component can function to change the 1-bromonaphthalene contact angle. Whether the component has such a function can be checked to observe whether the 1-bromonaphthalene contact angle measured within the surface of the magnetic layer changes due to the presence or absence of the 1-bromonaphthalene contact angle adjusting component. It is preferable that the 1-bromonaphthalene contact angle adjusting component functions to increase the value of the 1-bromonaphthalene contact angle. An aspect of the 1-bromonaphthalene contact angle adjusting component is a lubricant, and another aspect thereof is a polymer which will be described later. Hereinafter, these components will be sequentially described.

Lubricant

Examples of the lubricant include various lubricants such as a fatty acid, a fatty acid ester, and a fatty acid amide that are generally used in various magnetic recording media. The larger the amount of the lubricant contained in the magnetic layer is, the larger the value of the 1-bromonaphthalene contact angle measured within the surface of the magnetic layer tends to be.

Examples of the fatty acid include lauric acid, myristic acid, palmitic acid, stearic acid, oleic acid, linoleic acid, linolenic acid, behenic acid, erucic acid, elaidic acid, and the like. Among these, stearic acid, myristic acid, and palmitic acid are preferable, and stearic acid is more preferable. The fatty acid may be contained in the magnetic layer in the form of a salt such as a metal salt.

Examples of the fatty acid ester include esters of various fatty acids described above, such as butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

Examples of the fatty acid amide include amides of various fatty acids described above, such as lauric acid amide, myristic acid amide, palmitic acid amide, and stearic acid amide.

The content of the fatty acid in the composition for forming a magnetic layer with respect to 100.0 parts by mass of the ferromagnetic hexagonal ferrite powder is 0 to 10.0 parts by mass for example, preferably 0.1 to 10.0 parts by mass, more preferably 0.5 to 8.0 parts by mass, and even more preferably 1.0 to 7.0 parts by mass. In a case where two or more kinds of different fatty acids are used as the fatty acid, the content means the total content thereof. This point is true for other components. That is, in the present invention and the present specification, regarding a certain component, unless otherwise specified, one kind of the component may be contained in the composition or two or more kinds of the components may be contained in the composition. In a case where two or more kinds of certain components are contained in the composition, unless otherwise specified, the content of the components refers to the total content of two or more kinds of the components.

The content of the fatty acid ester as a content of the fatty acid ester in the composition for forming a magnetic layer with respect to 100.0 parts by mass of the ferromagnetic hexagonal ferrite powder is 0.1 to 10.0 parts by mass for example, preferably 0.5 to 8.0 parts by mass, and more preferably 1.0 to 7.0 parts by mass.

The content of the fatty acid amide in the composition for forming a magnetic layer with respect to 100.0 parts by mass of the ferromagnetic hexagonal ferrite powder is 0 to 3.0 parts by mass for example, preferably 0 to 2.0 parts by mass, and more preferably 0 to 1.0 part by mass.

In a case where the magnetic tape has a non-magnetic layer between the non-magnetic support and the magnetic layer, the non-magnetic layer may or may not contain a lubricant. Generally, at least a portion of the lubricant contained in the non-magnetic layer can move to and be present in the magnetic layer. The content of the fatty acid in the composition for forming a non-magnetic layer with respect to 100.0 parts by mass of the non-magnetic powder is 0 to 10.0 parts by mass for example, preferably 1.0 to 10.0 parts by mass, and more preferably 1.0 to 7.0 parts by mass. The content of the fatty acid ester with respect to 100.0 parts by mass of the non-magnetic powder is 0 to 10.0 parts by mass for example, and preferably 0.1 to 8.0 parts by mass. The content of the fatty acid amide in the composition for forming a non-magnetic layer with respect to 100.0 parts by mass of the non-magnetic powder is 0 to 3.0 parts by mass for example, and preferably 0 to 1.0 part by mass.

The fatty acid is preferably used together with one or more kinds of fatty acid derivatives, more preferably used together with one or more kinds of components selected from the group consisting of a fatty acid ester and a fatty acid amide, and even more preferably used together with a fatty acid ester and a fatty acid amide.

In a case where the fatty acid is used together with fatty acid derivatives (an ester, an amide, and the like), it is preferable that a fatty acid-derived portion of the fatty acid derivatives has a structure that is the same as or similar to the structure of the fatty acid used together with the derivatives. For example, in a case where stearic acid is used as a fatty acid, it is preferable to use a stearic acid ester such as butyl stearate and/or a stearic acid amide.

As the lubricant, those described in paragraph "0111" in JP2009-96798A can also be used.

Nitrogen-Containing Polymer

In the following description, a polymer which can function as the 1-bromonaphthalene contact angle adjusting component will be referred to as "1-bromonaphthalene contact angle adjuster" as well. As one of the aspects of the 1-bromonaphthalene contact angle adjuster, a nitrogen-containing polymer can be exemplified. Presumably, the polymer chain included in the nitrogen-containing polymer may make a contribution to the increasing of the 1-bromonaphthalene contact angle measured within the surface of the magnetic layer. The nitrogen-containing polymer refers to a polymer containing a nitrogen atom in the structure. Examples of preferred nitrogen-containing polymers include a polyalkylene imine-based polymer which a sort of amine-based polymer, an amine-based polymer other than the polyalkylene imine-based polymer, and the like. The polyalkylene imine-based polymer is a polymer having one or more polyalkylene imine chains. For details of the polyalkylene imine-based polymer, paragraphs "0035" to "0077" in JP2016-51493A can be referred to. Furthermore, for details of the amine-based polymer, paragraphs "0078" to "0080" in JP2016-51493A can be referred to.

In an aspect, the nitrogen-containing polymer is preferably a polymer having a weight-average molecular weight which is within a range that does not exceed the weight-average molecular weight of the binder contained in the magnetic layer. For example, the weight-average molecular weight of the nitrogen-containing polymer can be equal to or smaller than 80,000, 60,000, 40,000, 35,000, 30,000, 20,000, or 10,000. Furthermore, the weight-average molecular weight of the nitrogen-containing polymer can be, for example, equal to or greater than 1,000, 1,500, 2,000, or 3,000. In the present invention and the present specification, unless otherwise specified, the weight-average molecular weight is a value which is measured by gel permeation chromatography (GPC) and expressed in terms of polystyrene. The weight-average molecular weight can be measured under the following conditions, for example. Unless otherwise specified, the weight-average molecular weight shown in examples which will be described later is a value measured under the following conditions and expressed in terms of polystyrene.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: tetrahydrofuran (THF)

In a case where the 1-bromonaphthalene contact angle measured within the surface of the magnetic layer is adjusted using the nitrogen-containing polymer, the content of the nitrogen-containing polymer in the magnetic layer with respect to 100.0 parts by mass of the ferromagnetic hexagonal ferrite powder is preferably equal to or greater than 0.5 parts by mass, and more preferably equal to or greater than 1.0 part by mass. From the viewpoint of recording at high density, it is preferable that the content of other components in the magnetic layer is relatively small such that the filling rate of the ferromagnetic hexagonal ferrite powder is increased. In this respect, the content of the nitrogen-containing polymer in the magnetic layer with respect to 100.0 parts by mass of the ferromagnetic hexagonal ferrite powder is preferably equal to or smaller than 50.0 parts by mass, more preferably equal to or smaller than 40.0 parts by mass, even more preferably equal to or smaller than 30.0 parts by mass, still more preferably equal to or smaller than 20.0 parts by mass, yet more preferably equal to or smaller than 15.0 parts by mass, and much more preferably equal to or smaller than 10.0 parts by mass.

Regarding the method for controlling the 1-bromonaphthalene contact angle, paragraphs "0095" and "0098" in JP2016-51493A can be referred to.

Hereinafter, the magnetic recording medium will be more specifically described.

Magnetic Layer

Ferromagnetic Hexagonal Ferrite Powder

The magnetic layer of the magnetic recording medium contains ferromagnetic hexagonal ferrite powder as ferromagnetic powder. Regarding the ferromagnetic hexagonal ferrite powder, a magnetoplumbite type (referred to as "M type" as well), a W type, a Y type, and Z type are known as crystal structures of the hexagonal ferrite. The ferromagnetic hexagonal ferrite powder contained in the magnetic layer may take any of the above crystal structures. The crystal structures of the hexagonal ferrite contain an iron atom and a divalent metal atom as constituent atoms. The divalent metal atom is a metal atom which can become a divalent cation as an ion, and examples thereof include alkali earth metal atoms such as a barium atom, a strontium atom, and a calcium atom, a lead atom, and the like. For example, the hexagonal ferrite containing a barium atom as a divalent metal atom is barium ferrite, and the hexagonal ferrite containing a strontium atom is strontium ferrite. The hexagonal ferrite may be a mixed crystal of two or more kinds of hexagonal ferrite. As one of the mixed crystals, a mixed crystal of barium ferrite and strontium ferrite can be exemplified.

As the parameter of a particle size of the ferromagnetic hexagonal ferrite powder, activation volume can be used. "Activation volume" is the unit of magnetization inversion. The activation volume described in the present invention and the present specification is a value measured using a vibrating sample fluxmeter in an environment with an atmospheric temperature of 23° C.±1° C. by setting a magnetic field sweep rate to be 3 minutes and 30 minutes for a coercive force He measurement portion, and determined from the following relational expression of He and an activation volume V.

$$Hc = 2Ku/Ms\{1-[(kT/KuV)\ln(At/0.693)]^{1/2}\}$$

[In the expression, Ku: anisotropy constant, Ms: saturation magnetization, k: Boltzmann constant, T: absolute temperature, V: activation volume, A: spin precession frequency, t: magnetic field inversion time]

Examples of methods for achieving the high-density recording include a method of increasing a filling rate of ferromagnetic powder in the magnetic layer by reducing the particle size of the ferromagnetic powder contained in the magnetic layer. In this respect, the activation volume of the ferromagnetic hexagonal ferrite powder is preferably equal to or less than 2,500 nm$^3$, more preferably equal to or less than 2,300 nm$^3$, and even more preferably equal to or less than 2,000 nm$^3$. In contrast, from the viewpoint of the stability of magnetization, the activation volume is preferably equal to or greater than 800 nm$^3$, more preferably equal to or greater than 1,000 nm$^3$, and even more preferably equal to or greater than 1,200 nm$^3$, for example.

In order to identify the shape of the particles constituting the ferromagnetic hexagonal ferrite powder, the ferromagnetic hexagonal ferrite powder is imaged using a transmission electron microscope at a 100,000× magnification, and the image is printed on photographic paper such that the total magnification thereof becomes 500,000×. In the image of the particles obtained in this way, the outlines of particles (primary particles) are traced using a digitizer so as to identify the particle shape. The primary particles refer to independent particles not being aggregated with each other. The particles are imaged using a transmission electron microscope at an acceleration voltage of 300 kV by using a direct method. For performing observation and measurement using the transmission electron microscope, for example, it is possible to use a transmission electron microscope H-9000 manufactured by Hitachi High-Technologies Corporation and image analysis software KS-400 manufactured by Carl Zeiss AG. Regarding the shape of the particles constituting the ferromagnetic hexagonal ferrite powder, "plate-like" means a shape having two plate surfaces facing each other. Among particle shapes that do not have such plate surfaces, a shape having a major axis and a minor axis different from each other is "elliptical". The major axis is an axis (straight line) which is the longest diameter of a particle. The minor axis is a straight line which is the longest diameter of a particle in a direction orthogonal to the major axis. A shape in which the major axis and the minor axis are the same as each other, that is, a shape in which the major axis length equals the minor axis length is "spherical". A shape in which the major axis and the minor axis cannot be identified is called "amorphous". The imaging performed for identifying the particle shape by using a transmission electron microscope is carried out without performing an alignment treatment on the powder to be imaged. The ferromagnetic hexagonal ferrite powder used for preparing the composition for forming a magnetic layer and the ferromagnetic hexagonal ferrite powder contained in the magnetic layer may take any of the plate-like shape, the elliptical shape, the spherical shape and the amorphous shape.

The mean particle size relating to various powders described in the present invention and the present specification is an arithmetic mean of sizes determined for 500 particles randomly extracted using a particle image captured as described above. The mean particle size shown in examples which will be described later is a value obtained using a transmission electron microscope H-9000 manufactured by Hitachi High-Technologies Corporation as a transmission electron microscope and image analysis software KS-400 manufactured by Carl Zeiss AG as image analysis software.

For details of the ferromagnetic hexagonal ferrite powder, for example, paragraphs "0134" to "0136" in JP2011-216149A can also be referred to.

The content (filling rate) of the ferromagnetic hexagonal ferrite powder in the magnetic layer is preferably within a range of 50% to 90% by mass, and more preferably within a range of 60% to 90% by mass. The magnetic layer contains at least a binder and an abrasive as components other than the ferromagnetic hexagonal ferrite powder, and can optionally contain one or more kinds of additives. From the viewpoint of improving the recording density, the filling rate of the ferromagnetic hexagonal ferrite powder in the magnetic layer is preferably high.

Binder and Curing Agent

The magnetic layer of the magnetic recording medium contains a binder. As the binder, one or more kinds of resins are used. The resin may be a homopolymer or a copolymer. As the binder contained in the magnetic layer, a binder selected from an acryl resin obtained by copolymerizing a polyurethane resin, a polyester resin, a polyamide resin, a vinyl chloride resin, styrene, acrylonitrile, or methyl methacrylate, a cellulose resin such as nitrocellulose, an epoxy resin, a phenoxy resin, a polyvinyl alkyral resin such as polyvinyl acetal or polyvinyl butyral can be used singly, or a plurality of resins can be used by being mixed together. Among these, a polyurethane resin, an acryl resin, a cellulose resin, and a vinyl chloride resin are preferable. These resins can be used as a binder in a non-magnetic layer and/or a back coating layer which will be described later. Regarding the aforementioned binders, paragraphs "0029" to "0031" in JP2010-24113A can be referred to. The average molecular weight of the resin used as a binder can be equal to or greater than 10,000 and equal to or less than 200,000 in terms of a weight-average molecular weight, for example.

At the time of forming the magnetic layer, it is possible to use a curing agent together with a resin usable as the aforementioned binder. In an aspect, the curing agent can be a thermosetting compound which is a compound experiencing a curing reaction (crosslinking reaction) by heating. In another aspect, the curing agent can be a photocurable compound experiencing a curing reaction (crosslinking reaction) by light irradiation. The curing agent experiences a curing reaction in the manufacturing process of the magnetic recording medium. In this way, at least a portion of the curing agent can be contained in the magnetic layer, in a state of reacting (cross-linked) with other components such as the binder. The curing agent is preferably a thermosetting compound which is suitably polyisocyanate. For details of polyisocyanate, paragraphs "0124" and "0125" in JP2011-216149A can be referred to. The curing agent can be used by being added to the composition for forming a magnetic layer, in an amount of 0 to 80.0 parts by mass with respect to 100.0 parts by mass of the binder and preferably in an amount of 50.0 to 80.0 parts by mass from the viewpoint of improving the hardness of the magnetic layer.

Abrasive

The magnetic layer of the magnetic recording medium contains an abrasive. The abrasive refers to non-magnetic powder having a Mohs hardness of higher than 8, and is preferably non-magnetic powder having a Mohs hardness of equal to or higher than 9. The abrasive may be powder of an inorganic substance (inorganic powder) or powder of an organic substance (organic powder), and is preferably inorganic powder. The abrasive is more preferably inorganic powder having a Mohs hardness of higher than 8, and even more preferably inorganic powder having Mohs hardness of equal to or higher than 9. The maximum value of the Mohs hardness is 10 which is the Mobs hardness of diamond. Specific examples of the abrasive include powder of alumina ($Al_2O_3$), silicon carbide, boron carbide ($B_4C$), TiC, cerium oxide, zirconium oxide ($ZrO_2$), diamond, and the like. Among these, alumina powder is preferable. Regarding the alumina powder, paragraph "0021" in JP2013-229090A can also be referred to. As a parameter of the particle size of the abrasive, specific surface area can be used. The larger the specific surface area, the smaller the particle size. It is preferable to use an abrasive having a specific surface area (hereinafter, described as "BET specific surface area") of equal to or greater than 14 $m^2/g$, which is measured for primary particles by a Brunauer-Emmett-Teller (BET) method. From the viewpoint of dispersibility, it is preferable to use an abrasive having a BET specific surface area of equal to or less than 40 $m^2/g$. The content of the abrasive in the magnetic layer is preferably 1.0 to 20.0 parts by mass with respect to 100.0 parts by mass of the ferromagnetic hexagonal ferrite powder.

Additive

The magnetic layer contains the ferromagnetic hexagonal ferrite powder, the binder, and the abrasive, and may further contain one or more kinds of additives if necessary. As one of the additives, the aforementioned curing agent can be exemplified. Examples of the additives that can be contained in the magnetic layer include non-magnetic powder, a lubricant, a dispersant, a dispersion aid, a fungicide, an antistatic agent, an antioxidant, and the like. As one of the additives which can be used in the magnetic layer containing the abrasive, the dispersant described in paragraphs "0012" to "0022" in JP2013-131285A can be exemplified as a dispersant for improving the dispersibility of the abrasive in the composition for forming a magnetic layer.

Examples of the dispersant also include known dispersants such as a carboxy group-containing compound and a nitrogen-containing compound. The nitrogen-containing compound may be any one of a primary amine represented by $NH_2R$, a secondary amine represented by $NHR_2$, and a tertiary amine represented by $NR_3$, for example. R represents any structure constituting the nitrogen-containing compound, and a plurality of R's present in the compound may be the same as or different from each other. The nitrogen-containing compound may be a compound (polymer) having a plurality of repeating structures in a molecule. The inventors of the present invention consider that because the nitrogen-containing portion of the nitrogen-containing compound functions as a portion adsorbed onto the surface of particles of the ferromagnetic hexagonal ferrite powder, the nitrogen-containing compound can act as a dispersant. Examples of the carboxy group-containing compound include fatty acids such as oleic acid. Regarding the carboxy group-containing compound, the inventors of the present invention consider that because the carboxy group functions as a portion adsorbed onto the surface of particles of the ferromagnetic hexagonal ferrite powder, the carboxy group-containing compound can act as a dispersant. It is also preferable to use the carboxy group-containing compound and the nitrogen-containing compound in combination.

Examples of the non-magnetic powder that can be contained in the magnetic layer include non-magnetic powder (hereinafter, described as "projection-forming agent" as well) which can contribute to the control of frictional characteristics by forming projections on the surface of the magnetic layer. As such a non-magnetic powder, it is possible to use various non-magnetic powders generally used in a magnetic layer. The non-magnetic powder may be inorganic powder or organic powder. In an aspect, from the viewpoint of uniformizing the frictional characteristics, it is preferable that the particle size distribution of the non-magnetic powder is not polydisperse distribution having a plurality of peaks in the distribution but monodisperse distribution showing a single peak. From the viewpoint of ease of availability of the monodisperse particles, the non-magnetic powder is preferably inorganic powder. Examples of the inorganic powder include powder of a metal oxide, a metal carbonate, a metal sulfate, a metal nitride, a metal carbide, a metal sulfide, and the like. The particles constituting the non-magnetic powder are preferably colloidal particles, and more preferably colloidal particles of an inorganic oxide. From the viewpoint of ease of availability of the monodisperse particles, the inorganic oxide constituting the colloidal particles of an inorganic oxide is preferably silicon dioxide (silica). The colloidal particles of an inorganic oxide are preferably colloidal silica (colloidal silica particles). In the present invention and the present specification, "colloidal particles" refer to the particles which can form a colloidal dispersion by being dispersed without being precipitated in a case where the particles are added in an amount of 1 g per 100 mL of at least one organic solvent among methyl ethyl ketone, cyclohexanone, toluene, ethyl acetate, and a mixed solvent containing two or more kinds of the solvents described above at any mixing ratio. In another aspect, the non-magnetic powder is also preferably carbon black. The mean particle size of the non-magnetic powder is 30 to 300 nm for example, and preferably 40 to 200 nm. The content of the non-magnetic powder in the magnetic layer is, with respect to 100.0 parts by mass of the ferromagnetic hexagonal ferrite powder, preferably 1.0 to 4.0 parts by mass and more preferably 1.5 to 3.5 parts by mass, because then the non-magnetic filler can demonstrate better the function thereof.

As various additives that can be optionally contained in the magnetic layer, commercially available products or those manufactured by known methods can be selected and used according to the desired properties.

The magnetic layer described so far can be provided on the surface of the non-magnetic support, directly or indirectly through a non-magnetic layer.

Non-Magnetic Layer

Next, a non-magnetic layer will be described.

The magnetic recording medium may have the magnetic layer directly on the surface of the non-magnetic support, or may have a non-magnetic layer containing non-magnetic powder and a binder between the non-magnetic support and the magnetic layer. The non-magnetic powder contained in the non-magnetic layer may be inorganic powder or organic powder. Furthermore, carbon black or the like can also be used. Examples of the inorganic powder include powder of a metal, a metal oxide, a metal carbonate, a metal sulfate, a metal nitride, a metal carbide, a metal sulfide, and the like. These non-magnetic powders can be obtained as commercially available products, or can be manufactured by known methods. For details of the non-magnetic powder, paragraphs "0036" to "0039" in JP2010-24113A can be referred to. The content (filling rate) of the non-magnetic powder in the non-magnetic layer is preferably within a range of 50% to 90% by mass, and more preferably within a range of 60% to 90% by mass.

For other details of the binder, the additives, and the like of the non-magnetic layer, known techniques relating to the non-magnetic layer can be applied. For example, regarding the type and content of the binder, the type and content of the additives, and the like, known techniques relating to the magnetic layer can also be applied.

In the present invention and the present specification, the non-magnetic layer also includes a substantially non-magnetic layer which contains non-magnetic powder with a small amount of ferromagnetic powder as an impurity or by intention, for example. Herein, the substantially non-magnetic layer refers to a layer having a remnant flux density of equal to or lower than 10 mT or a coercive force of equal to or lower than 7.96 kA/m (100 Oe) or having a remnant flux density of equal to or lower than 10 mT and a coercive force of equal to or lower than 7.96 kA/m (100 Oe). It is preferable that the non-magnetic layer does not have remnant flux density and coercive force.

Non-Magnetic Support

Next, a non-magnetic support (hereinafter, simply described as "support" as well) will be described. Examples of the non-magnetic support include known supports such as biaxially oriented polyethylene terephthalate, polyethylene naphthalate, polyamide, polyamide imide, and aromatic polyamide. Among these, polyethylene terephthalate, polyethylene naphthalate, and polyamide are preferable. These supports may be subjected to corona discharge, a plasma treatment, an easy adhesion treatment, a heat treatment, and the like in advance.

Back Coating Layer

The magnetic recording medium can have a back coating layer containing non-magnetic powder and a binder, on a surface side of the non-magnetic support opposite to a surface side provided with the magnetic layer. It is preferable that the back coating layer contains either or both of carbon black and inorganic powder. Regarding the binder contained in the back coating layer and various additives which can be optionally contained therein, known techniques relating to the back coating layer can be applied, and known techniques relating to the formulation of the magnetic layer and/or the non-magnetic layer can also be applied.

Various Thicknesses

The thickness of the non-magnetic support and each layer in the magnetic recording medium will be described below.

The thickness of the non-magnetic support is 3.0 to 80.0 µm for example, preferably 3.0 to 50.0 µm, and more preferably 3.0 to 10.0 µm.

The thickness of the magnetic layer can be optimized according to the saturation magnetization of the magnetic head to be used, the length of head gap, the band of recording signals, and the like. The thickness of the magnetic layer is generally 10 nm to 100 nm. From the viewpoint of high-density recording, the thickness of the magnetic layer is preferably 20 to 90 nm, and more preferably 30 to 70 nm. The magnetic layer may be constituted with at least one layer, and may be separated into two or more layers having different magnetic characteristics. Furthermore, the constitution relating to known multi-layered magnetic layers can be applied. In a case where the magnetic layer is separated into two or more layers, the thickness of the magnetic layer means the total thickness of the layers.

The thickness of the non-magnetic layer is equal to or greater than 50 nm for example, preferably equal to or greater than 70 nm, and more preferably equal to or greater than 100 nm. In contrast, the thickness of the non-magnetic layer is preferably equal to or less than 800 nm, and more preferably equal to or less than 500 nm.

The thickness of the back coating layer is preferably equal to or less than 0.9 µm, and more preferably 0.1 to 0.7 µm.

The thickness of each layer and the non-magnetic support of the magnetic recording medium can be measured by known film thickness measurement methods. For example, a cross section of the magnetic recording medium in a thickness direction is exposed by known means such as ion beams or a microtome, and then the exposed cross section is observed using a scanning electron microscope. By observing the cross section, a thickness of one site in the thickness direction or an arithmetic mean of thicknesses of two or more randomly extracted sites, for example, two sites can be determined as various thicknesses. Furthermore, as the thickness of each layer, a design thickness calculated from the manufacturing condition may be used.

Manufacturing Process

Preparation of Composition for Forming Each Layer

The step of preparing a composition for forming the magnetic layer, the non-magnetic layer, or the back coating layer generally includes at least a kneading step, a dispersion step, and a mixing step that is performed if necessary before and after the aforementioned steps. Each of the aforementioned steps may be divided into two or more stages. The components used for preparing the composition for forming each layer may be added at the initial stage or in the middle of any of the above steps. For example, in an aspect, the composition for forming a magnetic layer can be prepared by preparing a dispersion liquid by mixing each of the ferromagnetic hexagonal ferrite powder and the abrasive with a solvent or the like and dispersing the mixture and then mixing the prepared various dispersion liquids with the remaining component (1-bromonaphthalene contact angle adjusting component or the like). Preferred aspects of the dispersion treatment for the ferromagnetic hexagonal ferrite powder will be described later. As a solvent, it is possible to use one kind of solvent or two or more kinds of solvents generally used for manufacturing a coating-type magnetic recording medium. Regarding the solvent, for example, paragraph "0153" in JP2011-216149A can be referred to. Furthermore, each of the components may be added in divided portions in two or more steps. For example, the binder may be added in divided portions in the kneading step, the dispersion step, and the mixing step performed after dispersion to adjust viscosity. In order to manufacture the aforementioned magnetic recording medium, the manufacturing techniques known in the related art can be used in various steps. In the kneading step, it is preferable to use an instrument having strong kneading force, such as an open kneader, a continuous kneader, a pressurized kneader, or an extruder. For details of the kneading treatment, JP1989-106338A (JP-H01-106338A) and JP1989-79274A (JP-H01-79274A) can be referred to. As a disperser, known ones can be used. The composition for forming each layer may be filtered by a known method before being subjected to a coating step. The filtration can be performed using a filter, for example. As the filter used for the filtration, for example, it is possible to use a filter having a pore size of 0.01 to 3 µm (for example, a filter made of glass fiber, a filter made of polypropylene, or the like).

Regarding the dispersion treatment for the composition for forming a magnetic layer, as described above, it is preferable to inhibit the occurrence of chipping. In order to inhibit chipping, in the step of preparing the composition for forming a magnetic layer, it is preferable to perform the dispersion treatment for the ferromagnetic hexagonal ferrite powder in two stages, such that coarse aggregates of the ferromagnetic hexagonal ferrite powder are disintegrated in the first stage of the dispersion treatment and then the second stage of the dispersion treatment is performed in which the collision energy applied to the particles of the ferromagnetic hexagonal ferrite powder due to the collision with dispersion beads is smaller than in the first dispersion treatment. According to the dispersion treatment described above, it is possible to achieve both of the improvement of dispersibility of the ferromagnetic hexagonal ferrite powder and the inhibition of occurrence of chipping.

Examples of preferred aspects of the aforementioned two-stage dispersion treatment include a dispersion treatment including a first stage of obtaining a dispersion liquid by performing a dispersion treatment on the ferromagnetic hexagonal ferrite powder, the binder, and the solvent in the presence of first dispersion beads, and a second stage of performing a dispersion treatment on the dispersion liquid obtained by the first stage in the presence of second dispersion beads having a bead size and a density smaller than a bead size and a density of the first dispersion beads. Hereinafter, the dispersion treatment of the aforementioned preferred aspect will be further described.

In order to improve the dispersibility of the ferromagnetic hexagonal ferrite powder, it is preferable that the first and second stages described above are performed as a dispersion treatment preceding the mixing of the ferromagnetic hexagonal ferrite powder with other powder components. For example, in a case where the magnetic layer containing the abrasive and the aforementioned non-magnetic powder is formed, it is preferable to perform the aforementioned first and second stages as a dispersion treatment for a liquid (magnetic liquid) containing the ferromagnetic hexagonal ferrite powder, the binder, the solvent, and additives optionally added, before the abrasive and the non-magnetic powder are mixed with the liquid.

The bead size of the second dispersion beads is preferably equal to or less than $1/100$ and more preferably equal to or less than $1/500$ of the bead size of the first dispersion beads. Furthermore, the bead size of the second dispersion beads can be, for example, equal to or greater than $1/10,000$ of the bead size of the first dispersion beads, but is not limited to this range. For example, the bead size of the second dispersion beads is preferably within a range of 80 to 1,000 nm. In contrast, the bead size of the first dispersion beads can be within a range of 0.2 to 1.0 mm, for example.

In the present invention and the present specification, the bead size is a value measured by the same method as used for measuring the aforementioned mean particle size of powder.

The second stage described above is preferably performed under the condition in which the second dispersion beads are present in an amount equal to or greater than 10 times the amount of the ferromagnetic hexagonal ferrite powder, and more preferably performed under the condition in which the second dispersion beads are present in an amount that is 10 to 30 times the amount of the ferromagnetic hexagonal ferrite powder, based on mass.

The amount of the first dispersion beads in the first stage is preferably within the above range.

The second dispersion beads are beads having a density smaller than that of the first dispersion beads. "Density" is obtained by dividing mass (unit: g) of the dispersion beads by volume (unit: $cm^3$) thereof. The density is measured by the Archimedean method. The density of the second dispersion beads is preferably equal to or lower than 3.7 $g/cm^3$, and more preferably equal to or lower than 3.5 $g/cm^3$. The density of the second dispersion beads may be equal to or higher than 2.0 $g/cm^3$ for example, and may be lower than 2.0 $g/cm^3$. In view of density, examples of the second dispersion beads preferably include diamond beads, silicon carbide beads, silicon nitride beads, and the like. In view of density and hardness, examples of the second dispersion beads preferably include diamond beads.

The first dispersion beads are preferably dispersion beads having a density of higher than 3.7 $g/cm^3$, more preferably dispersion beads having a density of equal to or higher than 3.8 $g/cm^3$, and even more preferably dispersion beads having a density of equal to or higher than 4.0 $g/cm^3$. The density of the first dispersion beads may be equal to or lower than 7.0 $g/cm^3$ for example, and may be higher than 7.0 $g/cm^3$. As the first dispersion beads, zirconia beads, alumina beads, or the like are preferably used, and zirconia beads are more preferably used.

The dispersion time is not particularly limited and may be set according to the type of the disperser used and the like.

Coating Step

The magnetic layer can be formed by, for example, directly coating the surface of the non-magnetic support with the composition for forming a magnetic layer or by performing multilayer coating by sequentially or simultaneously coating the surface of the support with the composition for forming a non-magnetic layer. The back coating layer can be formed by coating a surface, which is opposite to a surface provided with the magnetic layer (or a surface on which the magnetic layer is additionally provided), of the non-magnetic support with the composition for forming a back coating layer. For details of coating for forming each layer, paragraph "0066" in JP2010-231843A can be referred to.

Other Steps

Regarding various other steps for manufacturing the magnetic tape, paragraphs "0067" to "0070" in JP2010-231843A can be referred to. It is preferable to perform an alignment treatment on the coating layer of the composition for forming a magnetic layer while the coating layer is remaining wet (undried). Regarding the alignment treatment, it is possible to apply various known techniques including those described in paragraph "0067" in JP2010-231843A without any limitation. As described above, from the viewpoint of controlling the XRD intensity ratio, it is preferable to perform a vertical alignment treatment as the alignment treatment. Regarding the alignment treatment, the above description can also be referred to.

In the manner described so far, a magnetic recording medium according to an aspect of the present invention can be obtained. Here, the aforementioned manufacturing method is merely an example, and the value of each of the XRD intensity ratio, the squareness ratio in a vertical direction, and the 1-bromonaphthalene contact angle of the magnetic layer can be controlled within the aforementioned range by any means that can adjust the value, and this aspect is also included in the present invention.

The aforementioned magnetic recording medium according to an aspect of the present invention can be a tape-like magnetic recording medium (magnetic tape), for example. Generally, the magnetic tape is distributed and used in a state of being accommodated in a magnetic tape cartridge. In the magnetic tape, in order to enable head tracking servo to be performed in a drive, a servo pattern can also be formed by a known method. By mounting the magnetic tape cartridge on a drive (referred to as "magnetic tape device" as well) and running the magnetic tape in the drive such that a magnetic head contacts and slides on a surface of the magnetic tape (surface of a magnetic layer), information is recorded on the magnetic tape and reproduced. In order to continuously or intermittently perform repeated reproduction of the information recorded on the magnetic tape, the magnetic tape is caused to repeatedly run in the drive. According to an aspect of the present invention, it is possible to provide a magnetic tape in which the electromagnetic conversion characteristics thereof hardly deteriorate even though the head repeatedly slides on the surface of the magnetic layer while the tape is repeatedly running. Here, the magnetic recording medium according to an aspect of the present invention is not limited to the magnetic tape. The magnetic recording medium according to an aspect of the present invention is suitable as various magnetic recording media (a magnetic tape, a disc-like magnetic recording medium (magnetic disc), and the like) used in a sliding-type magnetic recording and/or reproduction device. The sliding-type device refers to a device in which a head contacts and slides on a surface of a magnetic layer in a case where information is recorded on a magnetic recording medium and/or the recorded information is reproduced. Such a device includes at least a magnetic tape and one or more magnetic heads for recording and/or reproducing information.

In the aforementioned sliding-type device, as the running speed of the magnetic tape is increased, it is possible to shorten the time taken for recording information and reproducing the recorded information. The running speed of the magnetic tape refers to a relative speed of the magnetic tape and the magnetic head. Generally, the running speed is set in a control portion of the device. As the running speed of the magnetic tape is increased, the pressure increases which is applied to both the surface of the magnetic layer and the magnetic head in a case where the surface of the magnetic layer and the magnetic head come into contact with each other. As a result, either or both of head scraping and magnetic layer scraping tend to easily occur. Accordingly, it is considered that the higher the running speed, the easier it is for the electromagnetic conversion characteristics to deteriorate during the repeated sliding. In the field of magnetic recording, the improvement of recording density is required. However, as the recording density is increased, the influence of the signal interference between the adjacent heads becomes stronger, and hence the electromagnetic conversion characteristics tend to be more easily deteriorate when the spacing loss is increased due to the repeated sliding. As described so far, as the running speed and the recording density are increased further, the deterioration of the electromagnetic conversion characteristics during the repeated sliding tends to be more apparent. In contrast, even in this case, according to the magnetic recording medium of an aspect of the present invention, it is possible to inhibit the deterioration of the electromagnetic conversion characteristics during the repeated sliding. The magnetic tape according to an aspect of the present invention is suitable for being used in a sliding-type device in which the running speed of the magnetic tape is, for example, equal to or higher than 5 m/sec (for example, 5 to 20 m/sec). In addition, the magnetic tape according to an aspect of the present invention is suitable as a magnetic tape for recording and reproducing information at a line recording density of equal to or higher than 250 kfci, for example. The unit kfci is the unit of a line recording density (this unit cannot be expressed in terms of the SI unit system). The line recording density can be equal to or higher than 250 kfci or equal to or higher than 300 kfci, for example. Furthermore, the line recording density can be equal to or lower than 800 kfci or higher than 800 kfci, for example.

EXAMPLES

Hereinafter, the present invention will be described based on examples, but the present invention is not limited to the aspects shown in the examples. In the following description, unless otherwise specified, "part" and "%" represent "part by mass" and "% by mass" respectively. Furthermore, unless otherwise specified, the steps and the evaluations described below were performed in an environment with an atmospheric temperature of 23° C.±+1° C.

Example 1

The formulations of compositions for forming each layer will be shown below.
Formulation of Composition for Forming Magnetic Layer
Magnetic Liquid
Plate-like ferromagnetic hexagonal ferrite powder (M-type barium ferrite): 100.0 parts
(activation volume: 1,500 $nm^3$)
Oleic acid: 2.0 parts
Vinyl chloride copolymer (MR-104 manufactured by ZEON CORPORATION): 10.0 parts
$SO_3Na$ group-containing polyurethane resin: 4.0 parts
(weight-average molecular weight: 70,000, $SO_3Na$ group: 0.07 meq/g)
Amine-based polymer (DISPERBYK-102 manufactured by BYK-Chemie GmbH): 6.0 parts
Methyl ethyl ketone: 150.0 parts
Cyclohexanone: 150.0 parts
Abrasive Liquid
α-Alumina: 6.0 parts
(BET specific surface area: 19 $m^2/g$, Mohs hardness: 9)
$SO_3Na$ group-containing polyurethane resin: 0.6 parts
(weight-average molecular weight: 70,000, $SO_3Na$ group: 0.1 meq/g)
2,3-Dihydroxynaphthalene: 0.6 parts
Cyclohexanone: 23.0 parts
Projection-forming agent liquid
Colloidal silica: 2.0 parts
(mean particle size: 80 nm)
Methyl ethyl ketone: 8.0 parts
1-Bromonaphthalene contact angle adjuster, lubricant, curing agent, and solvent
1-Bromonaphthalene contact angle adjuster: see Table 1
Stearic acid: see Table 1
Stearic acid amide: 0.3 parts
Butyl stearate: 6.0 parts
Methyl ethyl ketone: 110.0 parts
Cyclohexanone: 110.0 parts
Polyisocyanate (CORONATE (registered trademark) L manufactured by Tosoh Corporation): 3.0 parts
As the 1-bromonaphthalene contact angle adjuster, a polyalkylene imine-based polymer synthesized by the method described in paragraphs "0115" to "0124" in JP2016-51493A was used.
Formulation of Composition for Forming Non-Magnetic Layer
Non-magnetic inorganic powder α iron oxide: 100.0 parts
(mean particle size: 10 nm, BET specific surface area: 75 $m^2/g$)
Carbon black: 25.0 parts
(mean particle size: 20 nm)
$SO_3Na$ group-containing polyurethane resin: 18.0 parts
(weight-average molecular weight: 70,000, content of $SO_3Na$ group: 0.2 meq/g)
Stearic acid: 1.0 part Cyclohexanone: 300.0 parts
Methyl ethyl ketone: 300.0 parts
Formulation of Composition for Forming Back Coating Layer
  Non-magnetic inorganic powder α iron oxide: 80.0 parts
    (mean particle size: 0.15 μm, BET specific surface area: 52 m$^2$/g)
  Carbon black: 20.0 parts
    (mean particle size: 20 nm)
  Vinyl chloride copolymer: 13.0 parts
  Sulfonate group-containing polyurethane resin: 6.0 parts
  Phenyl phosphonate: 3.0 parts
  Cyclohexanone: 155.0 parts
  Methyl ethyl ketone: 155.0 parts
  Stearic acid: 3.0 parts
  Butyl stearate: 3.0 parts
  Polyisocyanate: 5.0 parts
  Cyclohexanone: 200.0 parts
  Preparation of Composition for Forming Magnetic Layer The composition for forming a magnetic layer was prepared by the following method.

The aforementioned various components of a magnetic liquid were dispersed for 24 hours by a batch-type vertical sand mill by using zirconia beads (first dispersion beads, density: 6.0 g/cm$^3$) having a bead size of 0.5 mm (first stage) and then filtered using a filter having a pore size of 0.5 μm, thereby preparing a dispersion liquid A. The amount of the used zirconia beads was 10 times the mass of the ferromagnetic hexagonal ferrite powder based on mass.

Then, the dispersion liquid A was dispersed for the time shown in Table 1 by a batch-type vertical sand mill by using diamond beads (second dispersion beads, density: 3.5 g/cm$^3$) having a bead size shown in Table 1 (second stage), and the diamond beads were separated using a centrifuge, thereby preparing a dispersion liquid (dispersion liquid B). The following magnetic liquid is the dispersion liquid B obtained in this way.

The aforementioned various components of an abrasive liquid were mixed together and put into a horizontal beads mill disperser together with zirconia beads having a bead size of 0.3 mm, and the volume thereof was adjusted such that bead volume/(volume of abrasive liquid)+bead volume equaled 80%. The mixture was subjected to a dispersion treatment by using the beads mill for 120 minutes, and the liquid formed after the treatment was taken out and subjected to ultrasonic dispersion and filtration treatment by using a flow-type ultrasonic dispersion and filtration device. In this way, an abrasive liquid was prepared.

The prepared magnetic liquid and abrasive liquid as well as the remaining components were introduced into a dissolver stirrer, stirred for 30 minutes at a circumferential speed of 10 m/sec, and then treated in 3 passes with a flow-type ultrasonic disperser at a flow rate of 7.5 kg/min. Thereafter, the resultant was filtered through a filter having a pore size of 1 μm, thereby preparing a composition for forming a magnetic layer.

The activation volume of the ferromagnetic hexagonal ferrite powder described above is a value measured and calculated using the powder that was in the same powder lot as the ferromagnetic hexagonal ferrite powder used for preparing the composition for forming a magnetic layer. The activation volume was measured using a vibrating sample fluxmeter (manufactured by TOEI INDUSTRY, CO., LTD.) by setting a magnetic field sweep rate to be 3 minutes and 30 minutes for a coercive force Hc measurement portion, and calculated from the relational expression described above. The activation volume was measured in an environment with a temperature of 23° C.±1° C.

Preparation of Composition for Forming Non-Magnetic Layer

The aforementioned various components of a composition for forming a non-magnetic layer were dispersed by a batch-type vertical sand mill for 24 hours by using zirconia beads having a bead size of 0.1 mm and then filtered using a filter having a pore size of 0.5 μm, thereby preparing a composition for forming a non-magnetic layer.

Preparation of Composition for Forming Back Coating Layer

Among the aforementioned various components of a composition for forming a back coating layer, the components except for the lubricant (stearic acid and butyl stearate), polyisocyanate, and 200.0 parts of cyclohexanone were kneaded and diluted using an open kneader and then subjected to a dispersion treatment in 12 passes by a horizontal beads mill disperser by using zirconia beads having a bead size of 1 mm by setting a bead filling rate to be 80% by volume, a circumferential speed of the rotor tip to be 10 m/sec, and a retention time per pass to be 2 minutes. Then, other components described above were added thereto, followed by stirring with a dissolver. The obtained dispersion liquid was filtered using a filter having a pore size of 1 μm, thereby preparing a composition for forming a back coating layer.

Preparation of Magnetic Tape

The surface of a polyethylene naphthalate support having a thickness of 5.0 μm was coated with the composition for forming a non-magnetic layer prepared as above such that the thickness thereof became 100 nm after drying, and the composition was dried, thereby forming a non-magnetic layer. The surface of the formed non-magnetic layer was coated with the composition for forming a magnetic layer prepared as above such that the thickness thereof became 70 nm after drying, thereby forming a coating layer. While the coating layer of the composition for forming a magnetic layer is remaining wet (undried state), a magnetic field having an intensity shown in Table 1 was applied thereto in a direction perpendicular to the surface of the coating layer so as to perform a vertical alignment treatment, and then the coating layer was dried.

Thereafter, a surface, which was opposite to the surface on which the non-magnetic layer and the magnetic layer were formed, of the support was coated with the composition for forming a back coating layer prepared as above such that the thickness thereof became 0.4 μm after drying, and the composition was dried. Then, by using a calender constituted solely with metal rolls and the calender rolls having a surface temperature of 90° C., a calender treatment (surface smoothing treatment) was performed on the obtained tape at a speed of 100 m/min and a line pressure of 300 kg/cm (294 kN/m). Subsequently, the resultant was subjected to a heat treatment for 36 hours in an environment with an atmospheric temperature of 70° C. After the heat treatment, the resultant was slit in a width of ½ inches (0.0127 meters), and by using a commercial servowriter, a servo pattern was formed on the magnetic layer.

In this way, a magnetic tape of Example 1 was obtained.

Evaluation of Deterioration of Electromagnetic Conversion Characteristics (Signal-to-Noise-Ratio; SNR)

The electromagnetic conversion characteristics of the magnetic tape of Example 1 were measured using a ½-inch (0.0127 meters) reel tester, to which a head was fixed, by the following method.

The running speed of the magnetic tape (relative speed of magnetic head/magnetic tape) was set to be the value shown in Table 1. A Metal-In-Gap (MIG) head (gap length: 0.15 μm, track width: 1.0 μm) was used as a recording head, and as a recording current, a recording current optimal for each magnetic tape was set. As a reproducing head, a Giant-Magnetoresistive (GMR) head having an element thickness of 15 nm, a shield gap of 0.1 μm, and a lead width of 0.5 m was used. Signals were recorded at a line recording density shown in Table 1, and the reproduced signals were measured using a spectrum analyzer manufactured by ShibaSoku Co., Ltd. A ratio between an output value of carrier signals and integrated noise in the entire bandwidth of the spectrum was taken as SNR. For measuring SNR, the signals of a portion of the magnetic tape, in which signals were sufficiently stabilized after running, were used.

Under the above conditions, each magnetic tape was caused to perform reciprocating running in 5,000 passes at 1,000 m/1 pass in an environment with a temperature of 40° C. and a relative humidity of 80%, and then SNR was measured. Then, a difference between SNR of the $1^{st}$ pass and SNR of the $5,000^{th}$ pass (SNR of the $5,000^{th}$ pass−SNR of the $1^{st}$ pass) was calculated.

The recording and reproduction described above were performed by causing the head to slide on a surface of the magnetic layer of the magnetic tape.

Examples 2 to 17

Magnetic tapes were prepared in the same manner as in Example 1 except that various items shown in Table 1 were changed as shown in Table 1, and the deterioration of the electromagnetic conversion characteristics (SNR) of the prepared magnetic tapes was evaluated.

In Table 1, in the example for which "N/A" is described in the column of Dispersion beads and the column of Time, the composition for forming a magnetic layer was prepared without performing the second stage in the dispersion treatment for the magnetic liquid.

In Table 1, in the example for which "N/A" is described in the column of Magnetic field intensity for vertical alignment treatment, the magnetic layer was formed without performing the alignment treatment.

A portion of each of the prepared magnetic tapes was used for the evaluation of the deterioration of electromagnetic conversion characteristics (SNR), and the other portion thereof was used for physical property evaluation described below.

Evaluation of Physical Properties of Magnetic Tape (1) XRD Intensity Ratio

From each of the magnetic tapes of Examples 1 to 17, tape samples were cut.

By using a thin film X-ray diffractometer (SmartLab manufactured by Rigaku Corporation), X-rays were caused to enter a surface of the magnetic layer of the cut tape sample, and In-Plane XRD was performed by the method described above.

From the X-ray diffraction spectrum obtained by In-Plane XRD, a peak intensity Int (114) of a diffraction peak of (114) plane and a peak intensity Int (110) of a diffraction peak of (110) plane of the hexagonal ferrite crystal structure were determined, and the XRD intensity ratio (Int (110)/Int (114)) was calculated.

(2) Squareness Ratio in Vertical Direction

For each of the magnetic tapes of Examples 1 to 17, by using a vibrating sample fluxmeter (manufactured by TOEI INDUSTRY, CO., LTD.), a squareness ratio in a vertical direction was determined by the method described above.

(3) Measurement of 1-Bromonaphthalene Contact Angle of Magnetic Layer

By using a contact angle meter (contact angle measuring device DropMaster 700 manufactured by Kyowa Interface Science Co., LTD.), the 1-bromonaphthalene contact angle was measured within the surface of the magnetic layer by the following method.

The magnetic tape wound up in the form of a roll was cut out from the end of the roll in a certain length. The tape sample obtained in this way was installed on slide glass such that the surface of the back coating layer came into contact with the surface of the slide glass. 2.0 μl of a liquid for measurement (1-bromonaphthalene) was added dropwise to the surface of the tape sample (surface of the magnetic layer), and the state where the dropped liquid formed a stabilized liquid droplet was visually checked. Then, by using contact angle analysis software FAMAS attached to the aforementioned contact angle meter, the image of the liquid droplet was analyzed, and the contact angle between the tape sample and the liquid droplet was measured. The contact angle was calculated by a θ/2 method, and the average of the values obtained by measuring the contact angle six times for one sample was taken as the 1-bromonaphthalene contact angle. The contact angle was measured in an environment with an atmospheric temperature of 25° C. and a relative humidity of 25% and determined under the following analysis conditions.

Method: sessile drop method (θ/2 method)
Recognition of droplet landing: automatic
Line of recognition of droplet landing (distance from needle tip): 50 dot
Algorithm: automatic
Image mode: frame
Threshold level: automatic The results obtained as above are shown in Table 1.

TABLE 1

| | Dispersion treatment for magnetic liquid Second stage | | | | | | |
|---|---|---|---|---|---|---|---|
| | Dispersion beads | | | | Magnetic field | Composition for forming magnetic layer | |
| | Type | Bead size | Formulation amount (mass or beads with respect to mass of ferromagnetic hexagonal ferrite powder) | Time | intensity for vertical alignment treatment | Amount of 1-bromonaphthalene contact angle adjuster added | Amount of stearic acid added |
| Example 1 | Diamond | 500 nm | 10 times greater | 1 h | 0.15 T | 4.0 parts | 3.0 parts |
| Example 2 | Diamond | 500 nm | 10 times greater | 1 h | 0.20 T | 4.0 parts | 3.0 parts |

TABLE 1-continued

| | | | | | | | |
|---|---|---|---|---|---|---|---|
| Example 3 | Diamond | 500 nm | 10 times greater | 1 h | 0.30 T | 4.0 parts | 3.0 parts |
| Example 4 | Diamond | 500 nm | 10 times greater | 1 h | 0.50 T | 4.0 parts | 3.0 parts |
| Example 5 | Diamond | 500 nm | 20 times greater | 1 h | 0.15 T | 4.0 parts | 3.0 parts |
| Example 6 | Diamond | 500 nm | 10 times greater | 1 h | 0.30 T | 4.0 parts | 3.0 parts |
| Example 7 | Diamond | 500 nm | 10 times greater | 1 h | 0.30 T | 6.0 parts | 3.0 parts |
| Example 8 | Diamond | 500 nm | 10 times greater | 1 h | 0.30 T | 10.0 parts | 3.0 parts |
| Example 9 | N/A | N/A | N/A | N/A | N/A | N/A | 2.0 parts |
| Example 10 | N/A | N/A | N/A | N/A | N/A | N/A | 2.0 parts |
| Example 11 | N/A | N/A | N/A | N/A | N/A | N/A | 2.0 parts |
| Example 12 | Diamond | 500 nm | 10 times greater | 1 h | 0.15 T | N/A | 2.0 parts |
| Example 13 | N/A | N/A | N/A | N/A | N/A | 4.0 parts | 3.0 parts |
| Example 14 | N/A | N/A | N/A | N/A | 0.15 T | 4.0 parts | 3.0 parts |
| Example 15 | N/A | N/A | N/A | N/A | 0.30 T | 4.0 parts | 3.0 parts |
| Example 16 | Diamond | 500 nm | 10 times greater | 1 h | 1.00 T | 4.0 parts | 3.0 parts |
| Example 17 | Diamond | 500 nm | 10 times greater | 1 h | N/A | 4.0 parts | 3.0 parts |

| | 1-Bromonaphthalene contact angle of magnetic layer (°) | XRD intensity ratio Int (110)/Int (114) | Squareness ratio in vertical direction | Running speed of magnetic tape | Line recording density | SNR deterioration |
|---|---|---|---|---|---|---|
| Example 1 | 50.5 | 0.5 | 0.70 | 6 m/s | 270 kfci | −0.5 dB |
| Example 2 | 50.1 | 1.5 | 0.75 | 6 m/s | 270 kfci | −0.9 dB |
| Example 3 | 50.4 | 2.3 | 0.80 | 6 m/s | 270 kfci | −0.8 dB |
| Example 4 | 50.4 | 4.0 | 0.85 | 6 m/s | 270 kfci | −0.5 dB |
| Example 5 | 50.8 | 0.7 | 0.83 | 6 m/s | 270 kfci | −0.4 dB |
| Example 6 | 50.2 | 2.3 | 0.80 | 8 m/s | 300 kfci | −0.8 dB |
| Example 7 | 52.9 | 2.3 | 0.80 | 8 m/s | 300 kfci | −0.5 dB |
| Example 8 | 54.8 | 2.3 | 0.80 | 8 m/s | 300 kfci | −0.3 dB |
| Example 9 | 48.0 | 0.2 | 0.55 | 4 m/s | 200 kfci | −1.0 dB |
| Example 10 | 48.0 | 0.2 | 0.55 | 6 m/s | 270 kfci | −3.0 dB |
| Example 11 | 48.0 | 0.2 | 0.55 | 8 m/s | 300 kfci | −4.3 dB |
| Example 12 | 48.2 | 0.5 | 0.70 | 6 m/s | 270 kfci | −2.5 dB |
| Example 13 | 50.3 | 0.2 | 0.55 | 6 m/s | 270 kfci | −2.3 dB |
| Example 14 | 50.5 | 3.8 | 0.63 | 6 m/s | 270 kfci | −2.4 dB |
| Example 15 | 50.2 | 5.0 | 0.75 | 6 m/s | 270 kfci | −2.5 dB |
| Example 16 | 50.2 | 6.1 | 0.90 | 6 m/s | 270 kfci | −2.9 dB |
| Example 17 | 50.4 | 0.3 | 0.66 | 6 m/s | 270 kfci | −2.5 dB |

From the results shown in Table 1, it was confirmed that in Examples 1 to 8, in which each of the XRD intensity ratio, the squareness ratio in a vertical direction, and the 1-bromonaphthalene contact angle of the magnetic layer of the magnetic tape is within the range described above, the electromagnetic conversion characteristics hardly deteriorate even though reproduction is repeated by causing the head to slide on the surface of the magnetic layer, unlike in Examples 9 to 17.

In Examples 9 to 11, magnetic tapes of the same physical properties were used, but the magnetic tapes had different running speeds and different line recording densities. Through the comparison between Examples 9 to 11, it is possible to confirm that as the running speed or the line recording density of the magnetic tape is increased, the deterioration of the electromagnetic conversion characteristics during the repeated sliding becomes more apparent. In Examples 1 to 8, the deterioration of the electromagnetic conversion characteristics during the repeated sliding could be inhibited.

One aspect of the present invention can be useful in the technical field of magnetic recording media for data storage such as data backup tapes.

What is claimed is:

1. A magnetic recording medium comprising:
a non-magnetic support; and
a magnetic layer which is provided on the support and contains ferromagnetic powder and a binder,
wherein the ferromagnetic powder is ferromagnetic hexagonal ferrite powder,
the magnetic layer contains an abrasive,
an intensity ratio (Int (110)/Int (114)) of a peak intensity Int (110) of a diffraction peak of (110) plane of a crystal structure of the hexagonal ferrite, determined by performing X-ray diffraction analysis on the magnetic layer by using an In-Plane method, to a peak intensity Int (114) of a diffraction peak of (114) plane of the crystal structure is equal to or higher than 0.5 and equal to or lower than 4.0,
a squareness ratio of the magnetic recording medium in a vertical direction is equal to or higher than 0.65 and equal to or lower than 1.00, and
a contact angle with 1-bromonaphthalene measured within a surface of the magnetic layer is in a range of 50.0° to 55.00.

2. The magnetic recording medium according to claim 1, wherein the squareness ratio in a vertical direction is equal to or higher than 0.65 and equal to or lower than 0.90.

3. The magnetic recording medium according to claim 1, further comprising:
a non-magnetic layer containing non-magnetic powder and a binder between the non-magnetic support and the magnetic layer.

4. The magnetic recording medium according to claim 1, further comprising:
a back coating layer containing non-magnetic powder and a binder on a surface, which is opposite to a surface provided with the magnetic layer, of the non-magnetic support.

5. The magnetic recording medium according to claim 1, which is a magnetic tape.

* * * * *